United States Patent
Franconi

(10) Patent No.: US 9,822,900 B2
(45) Date of Patent: Nov. 21, 2017

(54) PNEUMATIC MIXING VALVE

(71) Applicant: HONEYWELL INTERNATIONAL INC., Morristown, NJ (US)

(72) Inventor: Robert Franconi, New Hartford, CT (US)

(73) Assignee: HONEYWELL INTERNATIONAL INC, Morris Plains, NJ (US)

( * ) Notice: Subject to any disclaimer, the term of this patent is extended or adjusted under 35 U.S.C. 154(b) by 117 days.

(21) Appl. No.: 14/801,276

(22) Filed: Jul. 16, 2015

(65) Prior Publication Data

US 2017/0016555 A1    Jan. 19, 2017

(51) Int. Cl.
  F16K 11/078 (2006.01)
  F16K 31/122 (2006.01)
  F16K 11/06 (2006.01)

(52) U.S. Cl.
  CPC .......... *F16K 31/1225* (2013.01); *F16K 11/06* (2013.01)

(58) Field of Classification Search
  CPC .... F16K 31/1225; F16K 11/07; F16K 11/085; F16K 31/42
  See application file for complete search history.

(56) References Cited

U.S. PATENT DOCUMENTS

| | | | |
|---|---|---|---|
| 3,010,438 A * | 11/1961 | Fife | F15B 13/0402 137/625.6 |
| 3,188,148 A | 6/1965 | Eaton | |
| 3,263,702 A | 8/1966 | Pullen et al. | |
| 3,548,879 A * | 12/1970 | Wilde | B60T 8/3605 137/596.18 |
| 3,561,483 A * | 2/1971 | Taplin | G05D 11/003 137/625.4 |
| 3,561,484 A * | 2/1971 | Taplin | G05D 11/003 137/625.4 |
| 3,910,303 A | 10/1975 | Rydberg | |
| 4,674,526 A | 6/1987 | Athanassiu | |
| 4,747,575 A | 5/1988 | Putt et al. | |
| 4,775,117 A | 10/1988 | Standke | |
| 5,080,136 A | 1/1992 | Schiel et al. | |
| 5,393,014 A | 2/1995 | Weisend, Jr. et al. | |
| 6,050,081 A | 4/2000 | Jansen et al. | |
| 6,637,462 B2 * | 10/2003 | Foster, Jr. | F15B 13/0405 137/596.16 |
| 6,736,611 B2 | 5/2004 | Putt et al. | |
| 8,046,983 B2 * | 11/2011 | Lawrence | F02C 7/232 60/39.094 |
| 8,429,892 B2 | 4/2013 | Tentorio | |

(Continued)

*Primary Examiner* — Umashankar Venkatesan
(74) *Attorney, Agent, or Firm* — Lorenz & Kopf, LLP

(57) ABSTRACT

A pneumatic mixing valve is provided, which includes a housing that defines a first inlet, a second inlet and an outlet. The first inlet is coupled to a first fluid source and the second inlet is coupled to a second fluid source. The housing defines a first chamber and a second chamber. The pneumatic mixing valve includes a mixing system. The mixing system includes a piston that is movable by at least one of the first fluid and the second fluid. The housing defines a fluid passageway that extends from near the first inlet to the second chamber and the pneumatic mixing valve includes an actuator that is movable between a first position and a second position. In the first position, the fluid passageway is closed such the outlet is open, and in the second position, the fluid passageway is open such that the outlet is closed.

15 Claims, 8 Drawing Sheets

(56) References Cited

U.S. PATENT DOCUMENTS

| | | |
|---|---|---|
| 8,967,528 B2 | 3/2015 | Mackin et al. |
| 2006/0070655 A1 | 4/2006 | Tebby |
| 2010/0092116 A1* | 4/2010 | Franconi ............... F01D 25/125 |
| | | 384/317 |
| 2013/0115055 A1 | 5/2013 | Mottet et al. |

\* cited by examiner

PNEUMATIC MIXING VALVE

TECHNICAL FIELD

The present disclosure generally relates to a pneumatic mixing valve, and more particularly relates to a pneumatic mixing valve for mixing high pressure fluid flow and low pressure fluid flow based on differential pressure.

BACKGROUND

Certain mobile platforms, such as aircraft, employ anti-icing systems and environmental control systems during the operation of the mobile platform. In certain instances, these anti-icing systems and environmental control systems require a source of hot or heated gas (i.e. gas at a temperature greater than ambient temperature). In order to supply the hot or heated gas, in the example of an aircraft, the hot or heated gas may be bled from a gas turbine engine associated with the aircraft.

The bleeding of hot or heated gas from the gas turbine engine associated with the aircraft, however, may reduce performance or efficiency of the gas turbine engine. Moreover, in the example of gas turbine engines that include compressors with multiple stages, it may be more desirable to use hot or heated gas from a lower stage of the compressor than hot or heated gas from a higher stage of the compressor. However, in certain instances, the gas associated with the lower stage of the compressor may not be at a sufficient temperature for use by the anti-icing system and/or environmental control system.

Accordingly, it is desirable to provide an improved pneumatic mixing valve, which mixes high pressure fluid flow, such as flow from a higher stage of a compressor, with low pressure fluid flow, such as flow from a lower stage of a compressor to result in hot or heated gas at a desired temperature for use by a system of the mobile platform, such as an anti-icing system and/or an environmental control system. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a pneumatic mixing valve. The pneumatic mixing valve includes a housing that defines a first inlet, a second inlet and an outlet. The first inlet is adapted to be coupled to a first fluid source and the second inlet is adapted to be coupled to a second fluid source. The housing defines a first chamber fluidly separated from a second chamber. The first chamber is in fluid communication with the first inlet, the second inlet and the outlet. The pneumatic mixing valve includes a mixing system at least partially disposed in the first chamber. The mixing system includes a piston that is movable by at least one of the first fluid and the second fluid. The housing defines a fluid passageway that extends from near the first inlet to the second chamber and the pneumatic mixing valve includes an actuator that is movable between a first position and a second position. In the first position the fluid passageway is closed such the outlet is open, and in the second position, the fluid passageway is open such that the outlet is closed.

Also provided according to various embodiments is a pneumatic mixing valve. The pneumatic mixing valve includes a housing that defines a first inlet, a second inlet and an outlet. The first inlet is to be coupled to a first fluid source and the second inlet is to be coupled to a second fluid source. The second fluid source has fluid with a pressure different than a pressure of a fluid of the first fluid source. The housing defines a first chamber fluidly separated from a second chamber. The first chamber in fluid communication with the first inlet, the second inlet and the outlet. The pneumatic mixing valve includes a mixing system including a piston coupled to a sleeve by a rod. The sleeve is disposed in the first chamber and movable by at least one of the first fluid and the second fluid based on a differential pressure, and the piston is disposed in the second chamber and movable by the first fluid. The pneumatic mixing valve includes a check valve disposed in the outlet that prevents a flow of fluid into the outlet. The housing defines a fluid passageway that extends from near the first inlet to the second chamber. The pneumatic mixing valve includes an actuator having a ball 3-way valve that is movable between a first position and a second position. In the first position the fluid passageway is closed, and in the second position the fluid passageway is open such that the outlet is closed by the movement of the piston in the second chamber.

A pneumatic mixing valve is provided according to various embodiments. The pneumatic mixing valve includes a housing that defines a first inlet, a second inlet and an outlet. The first inlet is adapted to be coupled to a first fluid source, the second inlet is adapted to be coupled to a second fluid source, and the outlet includes a first opening spaced apart from a second opening. The housing defines a first chamber fluidly separated from a second chamber. The first chamber is in fluid communication with the first inlet, the second inlet and the outlet. The pneumatic mixing valve includes a mixing system including a piston coupled to a sleeve by a rod. The sleeve is disposed in the first chamber and is movable by at least one of the first fluid and the second fluid based on a differential pressure to allow at least one of the first fluid and the second fluid to exit at least one of the first opening and the second opening of the outlet. The piston is disposed in the second chamber and movable by the first fluid. The pneumatic mixing valve includes a check valve disposed in the outlet adjacent to the second opening to prevent a flow of fluid into the second opening of the outlet. The housing defines a fluid passageway that extends from near the first inlet to the second chamber. The pneumatic mixing valve includes an actuator that is movable between a first position and a second position. In the first position the fluid passageway is closed and in the second position, the fluid passageway is open such that the first opening and the second opening of the outlet are closed by the sleeve based on a movement of the piston in the second chamber.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any system that requires the mixing of fluid, such as a hydraulic system, etc., and that the pneumatic mixing valve described herein is merely one exemplary embodiment according to the present disclosure. Moreover, while the pneumatic mixing valve is described herein as being used onboard a mobile platform, such as a bus, motorcycle, train, motor vehicle, marine vessel, aircraft, rotorcraft and the like, the various teachings of the present disclosure can be used with a stationary fluid system as well. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
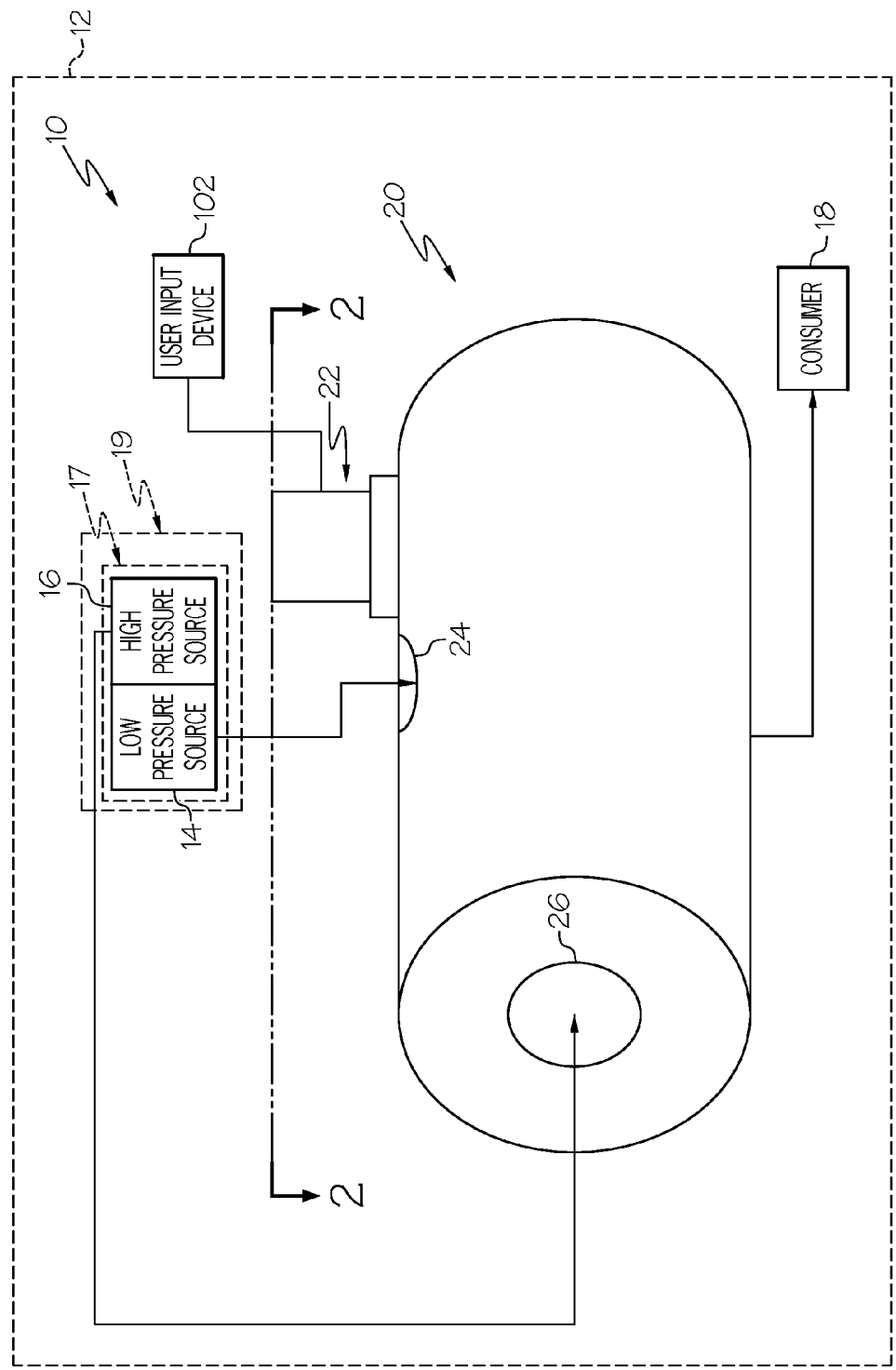
FIG. 1 is a schematic perspective illustration of a pneumatic mixing valve in accordance with various embodiments.

With reference to FIG. 1, a mixing valve 10 is shown. The mixing valve 10 can be employed with a mobile platform 12, such as a bus, motorcycle, train, motor vehicle, marine vessel, aircraft, rotorcraft and the like, to provide higher temperature fluid to a downstream consumer. The mixing valve 10 is in fluid communication with a low pressure fluid source 14 and a high pressure fluid source 16, and is in fluid communication with a consumer 18, such as an anti-icing system and/or an environmental control system associated with the mobile platform 12 that assists in controlling of cabin temperature and/or pressure. In the example of the mobile platform 12 as an aircraft, the low pressure fluid source 14 comprises fluid from a low stage of a compressor 17 associated with the mobile platform 12, such as an axial compressor associated with a gas turbine engine 19 of the aircraft, and the high pressure fluid source 16 comprises fluid from a higher stage of the compressor 17. In one example, the fluid is air, which is supplied from the low stage and higher stage of the compressor 17 of the gas turbine engine 19 through suitable conduits as known to one skilled in the art. As used herein, the term "differential pressure" is the difference in pressure between the high pressure fluid source 16 and the low pressure fluid source 14 at any given rotational speed (N2) of the gas turbine engine 19, which may be represented as:

$$P_{Diff} = P_{High} - P_{Low}$$

Generally, differential pressure increases as the engine shaft speed increases, increasing both the high and low pressure and associated air temperatures. The rate of increase of the high pressure source is higher than the low pressure source thus resulting in an increase in differential pressure as the speed of the gas turbine engine 19 increases.

As will be discussed herein, the mixing valve 10 uses differential pressure to mix low pressure fluid received from the low pressure fluid source 14 with high pressure fluid received from the high pressure fluid source 16 to output fluid with a suitable temperature, such as an elevated temperature fluid, for use by the consumer 18. Stated another way, the mixing valve 10 senses a change in pressure between the high pressure fluid source 16 and the low pressure fluid source 14 and adjusts to maintain a balanced pressure distribution. In one example, the mixing valve 10 includes a valve body or housing 20 and an actuator 22. As will be discussed in further detail herein, the actuator 22 can be responsive to user input to control the operation of the mixing valve 10. While certain conduits are illustrated herein for enabling fluid communication between various components and the mixing valve 10, it will be understood that the arrangement illustrated herein is merely exemplary. In this regard, any number of conduits and fluid couplings can be employed to provide fluid communication or fluid coupling between the various components and the mixing valve 10 as known to one skilled in the art. Thus, the arrangement of conduits contained herein is merely exemplary.

Figure 2:
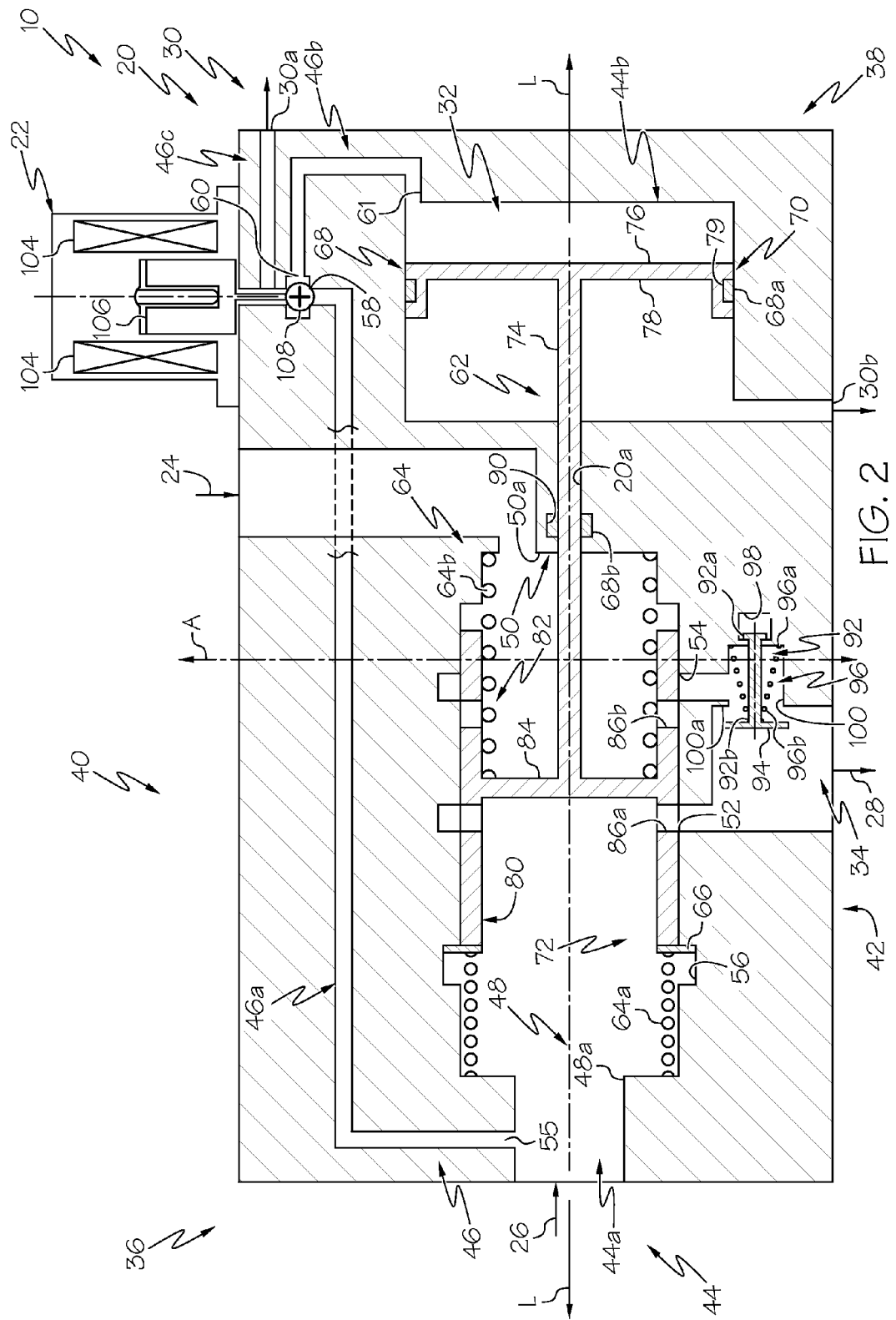
FIG. 2 is a schematic cross-sectional illustration of the pneumatic mixing valve of FIG. 1 in a first, initial position, taken along line 2-2 of FIG. 1, in accordance with various embodiments.

With continued reference to FIG. 2, the housing 20 defines a low pressure inlet 24, a high pressure inlet 26, an outlet 28 and one or more vent outlets 30. The housing 20 also includes a mixing system 32 and a check valve 34. While the housing 20 is illustrated herein as being substantially cylindrical (FIG. 1), it will be understood that the housing 20 may have any desired shape. Moreover, it will be understood that the housing 20 illustrated herein is merely one exemplary housing configuration for the mixing valve 10. In this regard, the components and/or fluid couplings associated with the mixing valve 10 can be contained within any suitable housing, including multiple housings. The housing 20 is composed of any suitable material, such as a metal, metal alloy or reinforced polymeric material. In one example, the housing 20 includes a first end 36, a second end 38, a first or top surface 40, a second or bottom surface 42, one or more chambers 44 and one or more fluid passageways 46. It should be noted that the location of the top surface 40 and the bottom surface 42 on the housing 20 is merely exemplary as the top surface 40 and the bottom surface 42 may be defined at any desired location along the body or perimeter of the housing 20.

The first end 36 defines the high pressure inlet 26. In one example, the high pressure inlet 26 is defined as a cylindrical bore, which is defined substantially symmetrically about a longitudinal axis L of the housing 20. While the high pressure inlet 26 is not illustrated herein as including coupling devices for coupling a fluid conduit from the high pressure fluid source 16 to the high pressure inlet 26, it will be understood that the high pressure inlet 26 can include one or more threaded couplings, clamping surfaces, etc. as known to one skilled in the art disposed about or within the high pressure inlet 26 to facilitate coupling the high pressure inlet 26 to the high pressure fluid source 16 (FIG. 1).

The second end 38 is opposite the first end 36. The second end 38 includes one of the one or more vent outlets 30, such as a vent outlet 30a (FIG. 2). The vent outlet 30a is substantially cylindrical; however, the vent outlet 30a can have any desired shape. The top surface 40 defines the low pressure inlet 24. In one example, the low pressure inlet 24 is defined as a cylindrical bore, which is defined substantially transverse to the longitudinal axis L of the housing 20. While the low pressure inlet 24 is not illustrated herein as including coupling devices for coupling a fluid conduit from the low pressure fluid source 14 to the low pressure inlet 24, it will be understood that the low pressure inlet 24 can include one or more threaded couplings, clamping surfaces, etc. as known to one skilled in the art disposed about or within the low pressure inlet 24 to facilitate coupling the low pressure inlet 24 to the low pressure fluid source 14 (FIG. 1).

The bottom surface 42 defines the outlet 28 and one of the one or more vent outlets 30, such as a vent outlet 30b. In one example, the outlet 28 is defined as a cylindrical bore, which is defined substantially transverse to the longitudinal axis L of the housing 20. While the outlet 28 is not illustrated herein as including coupling devices for coupling a fluid conduit from the outlet 28 to the consumer 18 (FIG. 1), it will be understood that the outlet 28 can include one or more threaded couplings, clamping surfaces, etc. as known to one skilled in the art disposed about or within the outlet 28 to facilitate coupling the outlet 28 to the consumer 18. The vent outlet 30b is substantially cylindrical; however, the vent outlet 30b can have any desired shape.

The one or more chambers 44 are defined within the housing 20. In one example, the housing 20 defines a first or mixing chamber 44a and a second or closing chamber 44b. The mixing chamber 44a and the closing chamber 44b cooperate to receive the mixing system 32 as will be discussed in greater detail herein. The mixing chamber 44a is defined in the housing 20 so as to be substantially symmetrical about the longitudinal axis L. The mixing chamber 44a is generally defined near the first end 36 and extends from near the first end 36 to near the second end 38. In one example, the mixing chamber 44a is defined in the housing 20 such that the mixing chamber 44a is asymmetric with respect to a central axis A extending through the housing 20, with the axis A substantially perpendicular to the longitudinal axis L.

The mixing chamber 44a includes a first end 48 and a second end 50. The first end 48 is in fluid communication with the high pressure inlet 26 at a first end opening 48a. Generally, the mixing chamber 44a has a diameter that is greater than a diameter of the high pressure inlet 26 and a diameter of the low pressure inlet 24; however, the mixing chamber 44a can have any suitable diameter. The second end 50 of the mixing chamber 44a is in fluid communication with the low pressure inlet 24 at a second end opening 50a. The second end opening 50a may have a diameter smaller than a diameter of the first end opening 48a. The mixing chamber 44a is also in fluid communication with the outlet 28 at an opening 52 and/or an opening 54 defined between the first end 48 and the second end 50. Generally, the opening 52 and the opening 54 have a diameter, which is smaller than the diameter of the first end opening 48a and the diameter of the second end opening 50a. As will be discussed in further detail herein, the opening 52 enables the high pressure fluid from the high pressure fluid source 16 to flow through the high pressure inlet 26, into the mixing chamber 44a, and exit through the opening 52 into the outlet 28. The opening 54 enables the low pressure fluid from the low pressure fluid source 14 to flow through the low pressure inlet 24, into the mixing chamber 44a, and exit through the opening 54 into the outlet 28.

The mixing chamber 44a also includes a retaining groove 56. The retaining groove 56 is defined about a portion of the mixing chamber 44a between the first end 48 and the opening 52. The retaining groove 56 has a diameter greater than the diameter of the mixing chamber 44a to retain a portion of the mixing system 32, as will be discussed in greater detail herein.

The closing chamber 44b is defined near the second end 38 of the housing 20. The closing chamber 44b is substantially offset relative to the axis A, and is asymmetrical with respect to the axis A. The closing chamber 44b is generally symmetric with respect to the longitudinal axis L. The closing chamber 44b has a diameter, which may be larger than a diameter of the mixing chamber 44a. Generally, the closing chamber 44b has a length extending along the longitudinal axis L that is less than a length of the mixing chamber 44a extending along the longitudinal axis L. The closing chamber 44b is in fluid communication with the vent outlet 30b.

As will be discussed, the one or more fluid passageways 46 enable the control of the mixing system 32. In one example, the one or more fluid passageways 46 comprise a first fluid passageway 46a, a second fluid passageway 46b and a third fluid passageway 46c. The first fluid passageway 46a is defined through the housing 20 from near the first end 36 to near the second end 38. The first fluid passageway 46a includes an inlet 55 in fluid communication with the high pressure inlet 26, such that high pressure fluid from the high pressure fluid source 16 may flow into the first fluid passageway 46a. The first fluid passageway 46a also includes an outlet 58 in fluid communication with the second fluid passageway 46b and in communication with the actuator 22. As will be discussed further herein, the outlet 58 is sized to receive a portion of the actuator 22, which enables or disables the flow of high pressure fluid through the first fluid passageway 46a into the second fluid passageway 46b. The second fluid passageway 46b includes an inlet 60, which is in fluid communication with the outlet 58 of the first fluid passageway 46a. The second fluid passageway 46b also includes an outlet 61, which is in fluid communication with the closing chamber 44b. The third fluid passageway 46c is in fluid communication with the outlet 58 of the first fluid passageway 46a and with the vent outlet 30a to enable excess fluid to vent into an area surrounding the mixing valve 10 based on a position of the actuator 22, as will be discussed in greater detail herein.

As discussed, the low pressure inlet 24 is defined through the top surface 40 of the housing 20, and extends into the housing 20 such that the low pressure inlet 24 is in fluid communication with the mixing chamber 44a at the second end 50. The high pressure inlet 26 is defined through the first end 36 of the housing 20, and extends into the housing 20 such that the high pressure inlet 26 is in fluid communication with the mixing chamber 44a at the first end 48. The outlet 28 is defined through the bottom surface 42 of the housing 20, and extends into the housing 20 such that the outlet 28 is in fluid communication with the mixing chamber 44a via the openings 52, 54. The one or more vent outlets 30 are defined through the housing 20 such that the vent outlet 30b is in fluid communication with the closing chamber 44b and the vent outlet 30a is in fluid communication with the first fluid passageway 46a.

The mixing system 32 is coupled to and movable within the housing 20. In one example, the mixing system 32 includes a piston 62, one or more biasing members 64, a biasing member retainer 66, and one or more sealing members 68. The piston 62 is received within the mixing chamber 44a and the closing chamber 44b. The piston 62 is movable between a plurality of positions within the mixing chamber 44a and the closing chamber 44b based on differential pressure as will be discussed in greater detail herein. The piston 62 includes a head 70 and a sleeve 72, which are interconnected via a rod 74. It should be understood that the head 70 and the sleeve 72 need not be interconnected via the rod 74, but rather, the rod 74 may be coupled to only one of the head 70 or the sleeve 72, if desired. The head 70 of the piston 62 is received and movable within the closing chamber 44b, and the sleeve 72 is received and movable within the mixing chamber 44a. The mixing system 32 is pneumatically balanced. In this regard, the sleeve 72 has substantially the same effective area onto which the pressurized fluid from the high pressure fluid source 16 and the low pressure fluid source 14 acts, thereby resulting in a pneumatically balanced mixing system 32. The head 70 is generally circular, however, the head 70 can have any desired shape configured to cooperate with the closing chamber 44b. In this example, the head 70 has a diameter that can be substantially the same diameter as the closing chamber 44b to substantially prevent leakage of fluid about the head 70 of the piston 62. The head 70 includes a first surface 76, a second surface 78 generally opposite the first surface 76 and a groove 79. The first surface 76 comprises a contact surface for contacting the fluid within and that enters the closing chamber 44b. The second surface 78 is coupled to the rod 74. The groove 79 is defined between the first surface 76 and the second surface 78, and is sized to receive one of the one or more sealing members 68.

The sleeve 72 is received and movable within the mixing chamber 44a based on a differential pressure. The sleeve 72 is substantially cylindrical, however, the sleeve 72 can have any desired shape to cooperate with the mixing chamber 44a. In one example, the sleeve 72 defines a first portion 80 and a second portion 82, which are separated by a support 84. Each of the first portion 80 and the second portion 82 can have a circumferentially open end, such that the sleeve 72 is substantially hollow except for the support 84. The first portion 80 is in fluid communication with the high pressure fluid from the high pressure inlet 26 and the second portion 82 is in fluid communication with the low pressure fluid from the low pressure inlet 24. Each of the first portion 80 and the second portion 82 define one or more channels 86. In one example, the first portion 80 defines a first channel 86a and the second portion 82 defines a second channel 86b. The first channel 86a is defined through the first portion 80 and provides a flow path for the high pressure fluid received from the high pressure inlet 26. The second channel 86b is defined through the second portion 82 and provides a flow path for the low pressure fluid received from the low pressure inlet 24. The channels 86 may be adjusted in size or shape to adjust the flow of the high pressure fluid and/or low pressure fluid through the channels 86. By contouring the shape and/or size of the channels 86, the flow of the high pressure fluid and/or low pressure fluid may be scheduled to meet desired operating conditions.

The support 84 separates the first portion 80 from the second portion 82, such that the high pressure fluid from the high pressure inlet 26 remains separated from the low pressure fluid from the low pressure inlet 24. The support 84 also couples the sleeve 72 to the rod 74. The rod 74 may interconnect the head 70 and the sleeve 72 such that the head 70 and the sleeve 72 move substantially in unison based on differential pressure. In this regard, a position of the sleeve 72 within the mixing chamber 44a is based on differential pressure between the high pressure fluid and the low pressure fluid, a spring load of the one or more biasing members 64 and any hysteresis of the mixing valve 10. The rod 74 is substantially cylindrical; however, the rod 74 can have any desired shape. The rod 74 extends through the housing 20 in a passage 20a defined between the mixing chamber 44a and the closing chamber 44b. Alternatively, the rod 74 is coupled to one of the head 70 or the sleeve 72 and is movable relative to the other of the head 70 and the sleeve 72 to contact the other of the head 70 and the sleeve 72 to provide a motive force upon movement of one of the head 70 or the sleeve 72 coupled to the rod 74. Thus, the rod 74 need not be directly coupled to the head 70.

The one or more biasing members 64 cooperate with the housing 20 to assist in the movement of the piston 62. In one example, the one or more biasing members 64 comprise a first spring 64a and a second spring 64b. Generally, the first spring 64a and the second spring 64b can comprise coil springs, however, the first spring 64a and the second spring 64b can comprise any suitable biasing member, such as a wave spring, leaf spring, etc. The first spring 64a is received within the mixing chamber 44a, so as to be positioned between the first end 48 of the mixing chamber 44a and the retaining groove 56. The first spring 64a has a spring force of about 30 pound force (lbf) to about 100 pound force (lbf) to bias the sleeve 72 towards the second end 50 of the mixing chamber 44a when the piston 62 is in a first, initial position. As will be discussed further herein, in a second, final position, the spring force of the first spring 64a may be overcome, such that the first spring 64a is compressed by the sleeve 72.

The second spring 64b is received within the mixing chamber 44a, so as to be positioned about the rod 74 between the second end 50 of the mixing chamber 44a and the support 84 of the sleeve 72. In one example, the second spring 64b is coupled to the support 84, such that the second spring 64b moves with the sleeve 72. The second spring 64b has a spring force of about 10 pound force (lbf) to about 40 pound force (lbf), which is generally less than the spring force of the first spring 64a such that the first spring 64a overcomes the spring force of the second spring 64b to bias the sleeve 72 towards the second end 50 of the mixing chamber 44a when the piston 62 is in the first, initial position. As will be discussed further herein, in the second, final position, the second spring 64b may be elongated, such that the first spring 64a stores energy to move the second spring 64b back into the first, initial position based on a movement of the actuator 22.

The biasing member retainer 66 is received within the retaining groove 56 of the mixing chamber 44a. The biasing member retainer 66 serves to retain the first spring 64a within the mixing chamber 44a, and also provides a spring seat against which the first spring 64a is biased. The biasing member retainer 66 also provides a surface against which the sleeve 72 contacts in order to compress the first spring 64a. In one example, the biasing member retainer 66 is a washer, having a diameter suitable to be received within the retaining groove 56 and to act as a spring seat, however, the biasing member retainer 66 can comprise any suitable mechanical structure known to one skilled in the art. The biasing member retainer 66 is generally movable within the retaining groove 56 between the first, initial position and the second, final position of the piston 62.

The one or more sealing members 68 generally prevent leakage of fluid about various components of the mixing system 32. In one example, the one or more sealing members 68 comprise a first sealing member 68a and a second sealing member 68b. The first sealing member 68a and the second sealing member 68b comprise any suitable dynamic sealing member, such as elastomeric O-ring seals, polymer seals, carbon piston rings or metal, such as steel, piston rings. The first sealing member 68a has a diameter suitable to be received within the groove 79 of the head 70 and is sized such that the first sealing member 68a substantially contacts a portion of the closing chamber 44b to substantially prevent the flow of fluid about the head 70 of the piston 62. The second sealing member 68b has a diameter suitable to be positioned about the rod 74 and to be received within a groove 90 defined in the housing 20 along the passage 20a to substantially prevent the leakage of fluid out of the mixing chamber 44a along the rod 74.

The check valve 34 substantially prevents a backflow of fluid from the outlet 28 into the mixing chamber 44a. In one example, the check valve 34 is coupled to the housing 20 so as to be disposed in the outlet 28 adjacent to the opening 54 of the mixing chamber 44a. Generally, the check valve 34 is movable within the outlet 28 to enable or disable a flow of fluid through the opening 54. The check valve 34 includes a valve stem 92, a valve seat 94 and a biasing member or spring 96.

The valve stem 92 includes a first end 92a and a second end 92b. The first end 92a is coupled to the housing 20 in a cavity 98 defined in the housing 20. The first end 92a is coupled to the housing 20 so as to be movable within the cavity 98 to enable the valve seat 94 to seat or unseat against an opening 100 defined in the housing 20 adjacent to the opening 54. The first end 92a also includes a flange to retain the valve stem 92 within the cavity 98. Generally, the valve stem 92 is cylindrical, however, the valve stem 92 can have any desired shape.

The valve seat 94 is coupled to the second end 92b of the valve stem 92. The valve seat 94 may be separate and discrete from the valve stem 92 or may be integrally formed with the valve stem 92 if desired. The valve seat 94 is annular or circular, and has a diameter sized to seat or seal against the opening 100 defined in the housing 20. Generally, the valve seat 94 is seated against a surface 100a that surrounds the opening 100 to seal and thereby prevent the flow of fluid out of the opening 54 and the flow of fluid back into the opening 54 in a position of the mixing system 32 defined between the first, initial position and the second, final position, as will be discussed in further detail herein.

The spring 96 is coupled about the valve stem 92 such that the valve stem 92 extends through or passes through a diameter defined by the spring 96. The spring 96 may be conical in shape, such that the spring 96 tapers from a first end 96a to a second end 96b. The spring 96 is illustrated as a coil compression spring; however, the spring 96 can comprise any suitable biasing member. The first end 96a of the spring 96 is coupled to the surface 100a of the housing 20 adjacent to the opening 100, and the second end 96b is coupled to the valve seat 94. The spring 96 has a spring force of about 0.5 pound force (lbf) to about 5 pound force (lbf), such that the spring 96 biases the valve seat 94 outward, away from the opening 100 in a rest position and may counteract any opposing loads such as vibrational loads. When the force of the spring 96 is overcome, due to fluid pressure and flow for example, the spring 96 is compressed by the valve seat 94 and the valve stem 92 moves or translates linearly within the cavity 98 until the valve seat 94 is seated or sealed against the opening 100. In one example, the check valve 34 moves such that the valve seat 94 is seated against the opening 100 at a fluid pressure of about 1 pound per square inch differential (psid) to about 5 pounds per square inch differential (psid). In addition, it should be noted that the check valve 34 may be coupled to the housing 20 such that the force of gravity may hold the check valve 34 in a closed position, and in this instance, the spring 96 may be eliminated.

The actuator 22 controls the operation of the mixing valve 10. In this regard, with reference to FIG. 1, the actuator 22 is responsive to one or more control signals received from a user input device 102 to enable or disable the flow of fluid from the outlet 28. The user input device 102 may be implemented as a keyboard (not separately shown), a microphone (not separately shown), a switch, a button, a touchscreen layer associated with or as part of a display associated with the mobile platform 12, or other suitable device to receive data and/or commands from a user, engine control system associated with the mobile platform 12 or full authority digital engine (or electronics) control system (FADEC) associated with the mobile platform 12. Of course, multiple input devices 102 can also be utilized to provide the one or more control signals to the actuator 22. The actuator 22 is in communication with the user input device 102 over a suitable architecture or arrangement that facilitates the transfer of data, commands, electrical current, power, etc. In one example, the actuator 22 comprises a solenoid valve. As solenoid valves are generally known to one of skill in the art, the actuator 22 will not be discussed in great detail herein.

Briefly, however, with reference to FIG. 2, the actuator 22 includes one or more coils 104, an armature 106 and a ball 3-way valve 108. The one or more coils 104 each comprise a cylindrical coil of wire that are responsive to electrical current received in the one or more control signals. The energizing of the one or more coils 104 by the one or more control signals causes the one or more coils 104 to act as a magnet as is generally known. The armature 106 comprises a metallic material, such as iron or another magnetically responsive material, and is movable relative to the one or more coils 104 between a first position and a second position. When the one or more coils 104 are energized based on the receipt of the one or more control signals, the armature 106 is drawn or moved upward from the first position to the second position. When the one or more coils 104 are not energized, the armature 106 is in the first position.

As the ball 3-way valve 108 is coupled to the armature 106, the movement of the armature 106 between the first position and the second position moves the ball 3-way valve 108. When the armature 106 is in the first position, the ball 3-way valve 108 is received in the outlet 58 of the first fluid passageway 46a, such that the fluid passageway defined by the first fluid passageway 46a and the second fluid passageway 46b is closed. With the armature 106 in the first position, the second fluid passageway 46b is fluidly coupled to the third fluid passageway 46c to enable any excess fluid to be vented to the exterior of the housing 20 via the vent outlet 30a. When the armature 106 is in the second position, such as when the one or more coils 104 are energized based on the receipt of the one or more control signals, the ball 3-way valve 108 is moved out of the outlet 58 of the first fluid passageway 46a, such that fluid flows from the first fluid passageway 46a to the second fluid passageway 46b and the fluid passageway defined by the first fluid passageway 46a and the second fluid passageway 46b is open. With the armature 106 in the second position, the third fluid passageway 46c is blocked, thereby preventing venting of the fluid out of the vent outlet 30a. As will be discussed, the flow of fluid through the first fluid passageway 46a into and through the second fluid passageway 46b causes the fluid to enter the closing chamber 44b and apply a fluid force or pressure on the head 70 of the piston 62. The application of the fluid force or pressure on the head 70 of the piston 62 moves the piston 62, and thus, the sleeve 72 to close the openings 52, 54 and thereby prevents the flow of fluid out of the outlet 28.

In order to assemble the mixing valve 10, in one exemplary method, with the housing 20 formed, the biasing member retainer 66 is positioned within the retaining groove 56. Then, the first spring 64a is positioned within the housing 20 so as to bias against the biasing member retainer 66 and the first end 48 of the mixing chamber 44a. The second spring 64b is coupled to the sleeve 72, and the mixing system 32 is inserted into the housing 20 such that the sleeve 72 is positioned within the mixing chamber 44a and the head 70 is positioned within the closing chamber 44b. It should be noted that although the piston 62 is illustrated and described herein as comprising a uniform or single piece part, one or more of the head 70, sleeve 72 and the rod 74 may be separately formed and coupled together using suitable techniques, such as mechanical fasteners, to form the piston 62 to facilitate the assembly of the mixing system 32 within the housing 20. Moreover, the housing 20 can comprise multiple pieces, which can be coupled together to aid in assembly of the mixing valve 10. Generally, the second sealing member 68b is positioned within the housing 20 prior to the insertion of the rod 74 within the housing 20, and the first sealing member 68a is coupled to the head 70 of the piston 62 prior to the insertion of the piston 62 into the housing 20. The valve stem 92, with the valve seat 94 and spring 96 coupled to the valve stem 92, is coupled to the cavity 98 to couple the check valve 34 to the housing 20. The actuator 22 is also coupled to the housing 20, such that the ball 3-way valve 108 is received within the outlet 58 of the first fluid passageway 46a.

Figure 3:
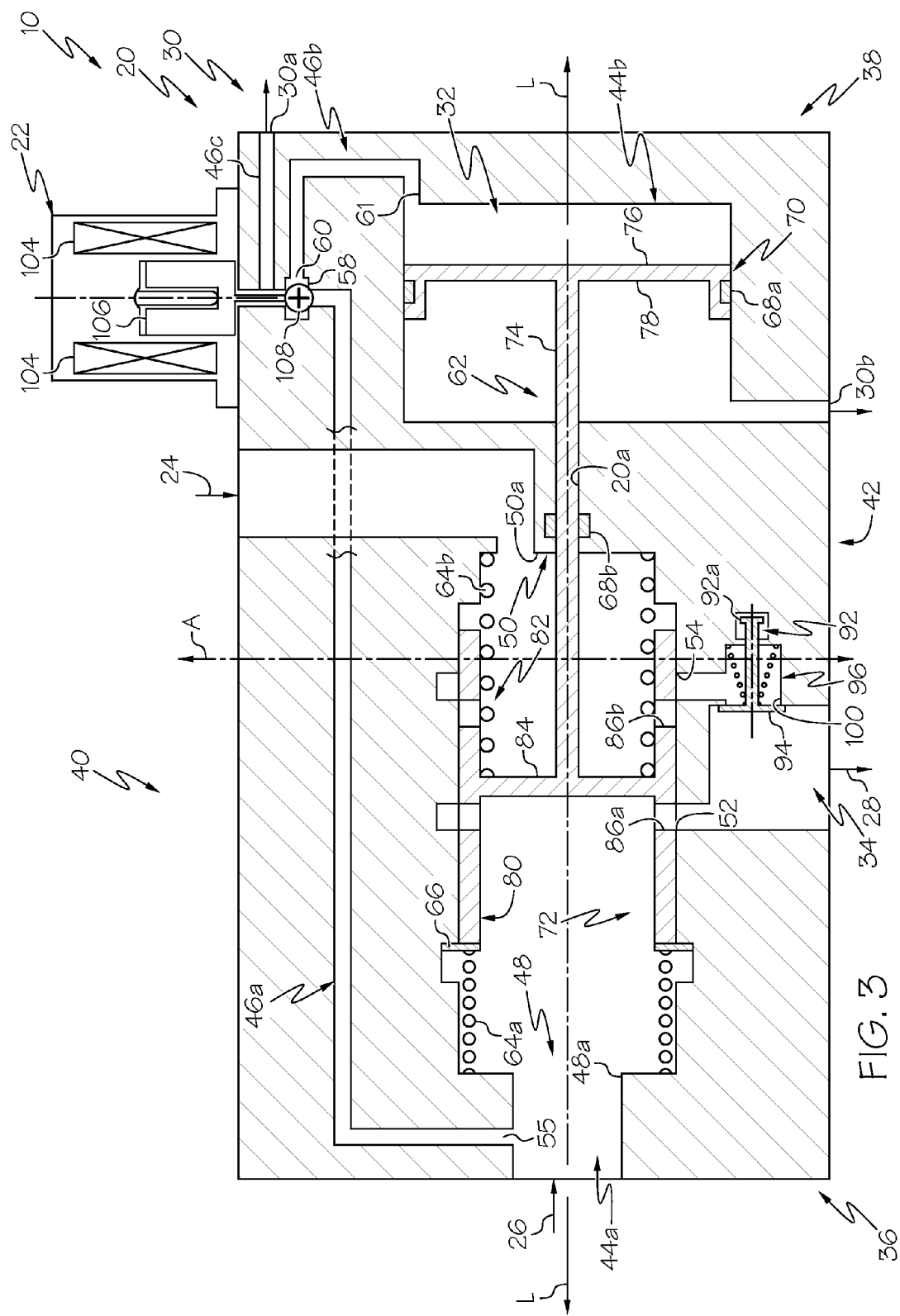
FIG. 3 is a schematic cross-sectional illustration of the pneumatic mixing valve of FIG. 1 in a third position, taken along line 2-2 of FIG. 1, in accordance with various embodiments.

With the mixing valve 10 assembled, the mixing valve 10 is fluidly coupled to the low pressure fluid source 14, the high pressure fluid source 16 and the consumer 18 through one or more fluid conduits as known to one skilled in the art. The mixing valve 10 is in the first, initial position prior to the receipt of fluid from the low pressure fluid source 14 and/or high pressure fluid source 16, and the one or more coils 104 of the actuator 22 are de-energized. In the first, initial position, the first channel 86a of the sleeve 72 is substantially coaxially aligned with the opening 52 to enable fluid flow through the opening 52 and the second channel 86b is substantially offset from the opening 54 to prevent the flow of fluid through the opening 54. Thus, in the first, initial position, the mixing valve 10 is configured to enable the flow of substantially only high pressure air through the mixing valve 10. Upon receipt of the high pressure fluid from the high pressure fluid source 16, with reference to FIG. 3, the high pressure fluid flows through the mixing chamber 44a, into the first channel 86a of the sleeve 72 and the opening 52. The flow of the high pressure fluid through the opening 52 overcomes the spring force of the spring 96 to move the check valve 34 such that the valve seat 94 seats or seals about the opening 100 to prevent the flow of fluid to/from the opening 54. Thus, FIG. 3 illustrates a third, high pressure fluid flow position of the mixing valve 10. In one example, the mixing valve 10 transitions from high pressure fluid flow to low pressure fluid flow by about 50 pounds per square inch differential (psid) and about 500 degrees Fahrenheit (F.).

Figure 4:
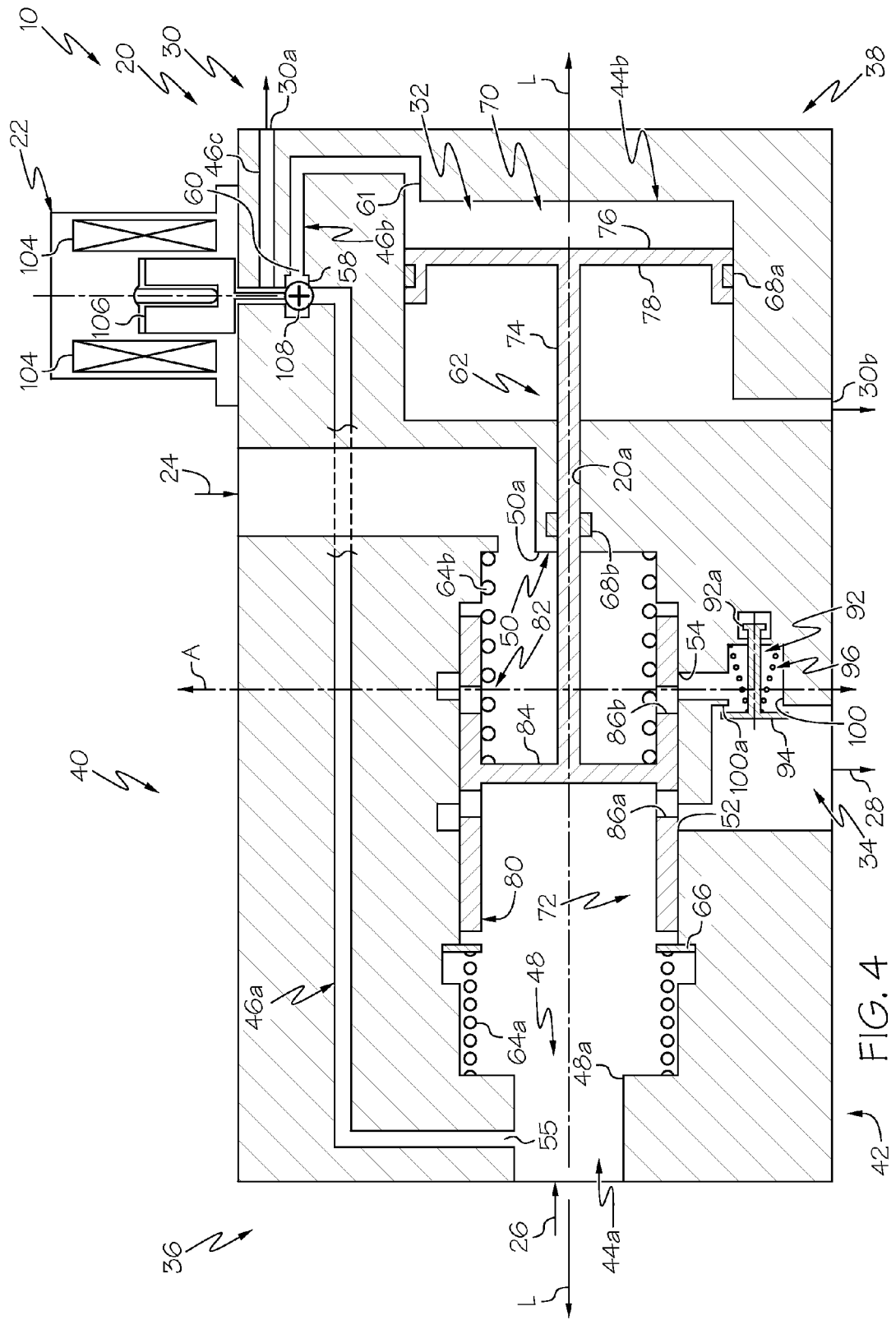
FIG. 4 is a schematic cross-sectional illustration of the pneumatic mixing valve of FIG. 1 in a fourth position, taken along line 2-2 of FIG. 1, in accordance with various embodiments.

As low pressure fluid flows into the mixing valve 10 from the low pressure fluid source 14, the low pressure fluid begins to increase in temperature and pressure due to the continued operation and speed increase of the low pressure fluid source 14 and the temperature and pressure of the high pressure fluid increases. Generally, both the temperature and the pressure of the low pressure fluid source 14 and the high pressure fluid source 16 increase substantially simultaneously over the operation of the gas turbine engine 19. The flow of the high pressure fluid through the high pressure inlet 26 causes a change in differential pressure, which moves the sleeve 72 such that the first channel 86a is partially aligned with the opening 52 and the second channel 86b is partially aligned with the opening 54 to enable both high pressure fluid flow and low pressure fluid flow into the outlet 28 as shown in FIG. 4. The flow of the low pressure fluid into the opening 54 moves the valve seat 94 slightly away from the surface 100a to enable the flow of the low pressure fluid into the outlet 28. In this position of the mixing valve 10, the valve seat 94 is not fully extended away from the surface 100a, but rather, is in an intermediate position defined between a fully extended position (FIG. 5) and a fully seated position (FIG. 3). Thus, FIG. 4 illustrates a fourth, high pressure fluid and low pressure fluid flow position of the mixing valve 10. In one example, the mixing valve 10 mixes flow between the high pressure fluid and the low pressure fluid to maintain a temperature at the outlet 28 at or below about 600 degrees Fahrenheit (F.) and a low pressure of about 30 pounds per square inch gauge (psig) and a high pressure of about 80 pounds per square inch gauge (psig).

Figure 5:
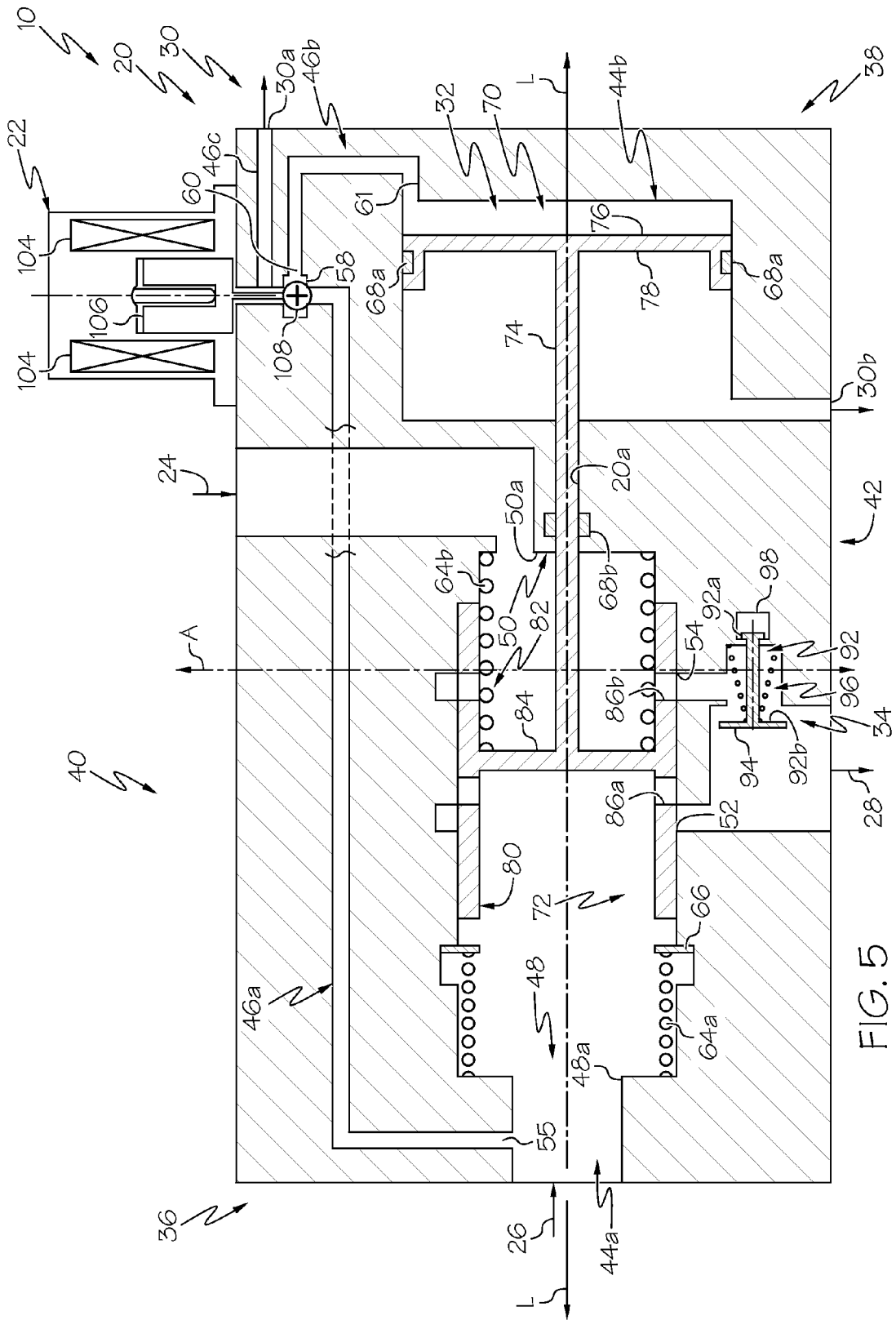
FIG. 5 is a schematic cross-sectional illustration of the pneumatic mixing valve of FIG. 1 in a fifth position, taken along line 2-2 of FIG. 1, in accordance with various embodiments.

Over time, as the temperature and pressure of the low pressure fluid increases and the pressure of the high pressure fluid from the high pressure fluid source 16 also increases further, the further change in the differential pressure moves the sleeve 72, such that the first channel 86a is no longer aligned with the opening 52 and the second channel 86b is substantially coaxially aligned with the opening 54 to enable substantially only low pressure fluid flow into the outlet 28 as shown in FIG. 5. The flow of the low pressure fluid into the opening 54 moves the valve seat 94 such that the valve seat 94 is fully extended away from the surface 100a to enable the flow of the low pressure fluid into the outlet 28. Thus, FIG. 5 illustrates a fifth, low pressure fluid flow position of the mixing valve 10. In the fifth, low pressure flow position, the pressure differential between the high and low pressure fluid is approximately 30 pounds per square inch differential (psid) and a low pressure temperature of about 300 degrees Fahrenheit (F.) or greater.

Figure 6:
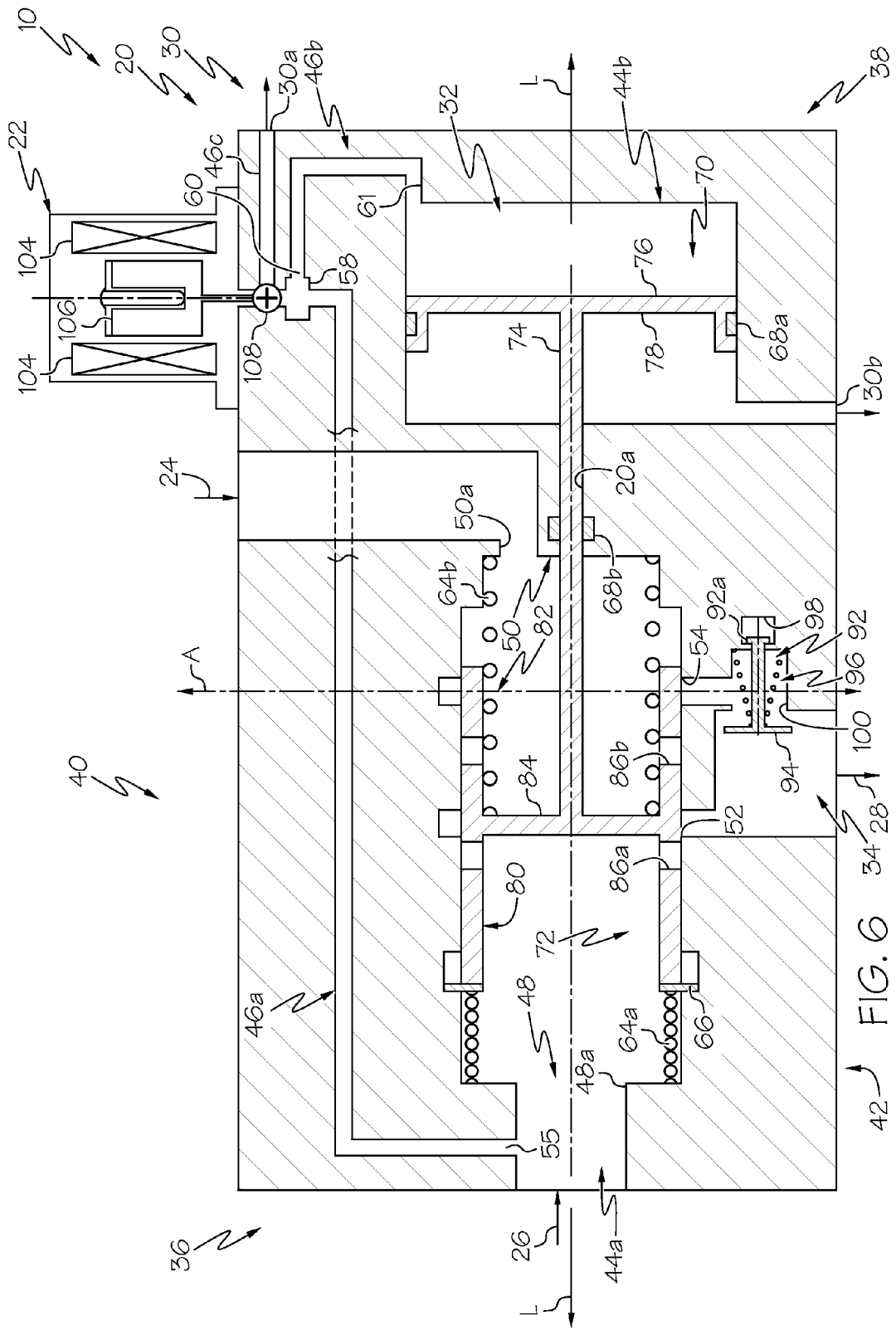
FIG. 6 is a schematic cross-sectional illustration of the pneumatic mixing valve of FIG. 1 in a second, final position, taken along line 2-2 of FIG. 1, in accordance with various embodiments.

With reference to FIG. 6, upon receipt of the one or more control signals from the user input device 102, for example, the one or more coils 104 are energized. By energizing the one or more coils 104, the armature 106 is drawn up between the one or more coils 104, thereby moving the ball 3-way valve 108 from the outlet 58 of the first fluid passageway 46a. By moving the ball 3-way valve 108 from the outlet 58 of the first fluid passageway 46a, the high pressure fluid from the high pressure inlet 26 flows through the first fluid passageway 46a into the second fluid passageway 46b and the third fluid passageway 46c is blocked, and high pressure flow from the high pressure inlet 26 flows from the second fluid passageway 46b into the closing chamber 44b. The high pressure fluid flow in the closing chamber 44b acts on the head 70 of the piston 62, and overcomes the spring force of the first spring 64a to move the sleeve 72 such that the first channel 86a and the second channel 86b are not aligned with the opening 52 and/or the opening 54, thereby preventing the flow of fluid into the outlet 28.

Figure 7:
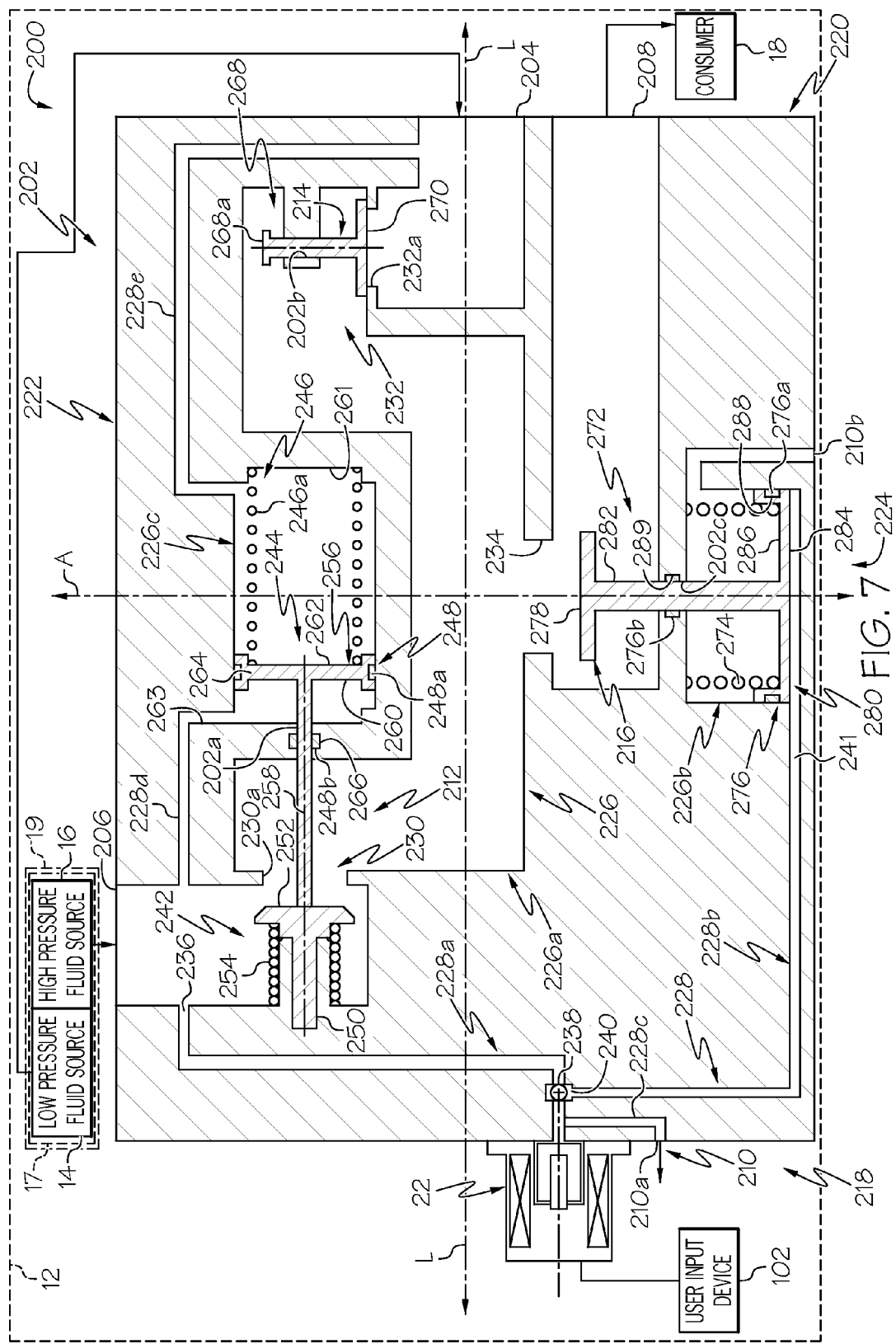
FIG. 7 is a schematic cross-sectional illustration of a pneumatic mixing valve in accordance with various embodiments.

With reference now to FIG. 7, a schematic illustration of a mixing valve 200 is shown. As the mixing valve 200 can be similar to the mixing valve 10 discussed with regard to FIGS. 1-6, only the differences between the mixing valve 10 and the mixing valve 200 will be discussed in detail herein, with the same reference numerals used to denote the same or substantially similar components. The mixing valve 200 can be employed with the mobile platform 12, such as a bus, motorcycle, train, motor vehicle, marine vessel, aircraft, rotorcraft and the like, to provide elevated temperature fluid to a downstream consumer. With reference to FIG. 7, the mixing valve 200 is in fluid communication with the low pressure fluid source 14 and the high pressure fluid source 16, and is in fluid communication with the consumer 18, such as an anti-icing system and/or an environmental control system associated with the mobile platform 12.

The mixing valve 200 uses differential pressure to mix low pressure fluid received from the low pressure fluid source 14 with high pressure fluid received from the high pressure fluid source 16 to output fluid with a suitable temperature for use by the consumer 18. In one example, the mixing valve 200 includes a valve body or housing 202 and the actuator 22. As discussed with regard to FIGS. 1-6, the actuator 22 is responsive to user input from the user input device 102 to control the operation of the mixing valve 200. While certain conduits are illustrated herein for enabling fluid communication between various components and the mixing valve 200, it will be understood that the arrangement illustrated herein is merely exemplary. In this regard, any number of conduits and fluid couplings can be employed to provide fluid communication or fluid coupling between the various components and the mixing valve 200 as known to one skilled in the art. Thus, the arrangement of conduits contained herein is merely exemplary.

With continued reference to FIG. 7, the housing 202 defines a low pressure inlet 204, a high pressure inlet 206, an outlet 208 and one or more vent outlets 210. The housing 202 also includes a mixing system 212, a check valve 214 and a shutoff valve 216. While not specifically illustrated herein, the housing 202 is substantially cylindrical, but it will be understood that the housing 202 may have any desired shape. Moreover, the components and/or fluid couplings associated with the mixing valve 200 can be contained within any suitable housing, including multiple housings. The housing 202 is composed of any suitable material, such as a metal, metal alloy or reinforced polymeric material. In one example, the housing 202 includes a first end 218, a second end 220, a first or top surface 222, a second or bottom surface 224, one or more chambers 226 and one or more fluid passageways 228. It should be noted that the location of the top surface 222 and the bottom surface 224 on the housing 202 is merely exemplary as the top surface 222 and the bottom surface 224 may be defined at any desired location along the body or perimeter of the housing 202.

The actuator 22 is coupled to the first end 218. The first end 218 also defines one of the one or more vent outlets 210, such as a vent outlet 210a. The vent outlet 210a is substantially circular; however, the vent outlet 210a can have any desired shape. The second end 220 is opposite the first end 218. The second end 220 defines the low pressure inlet 204. In one example, the low pressure inlet 204 is defined as a cylindrical bore, which is defined along a longitudinal axis L of the housing 202. While the low pressure inlet 204 is not illustrated herein as including coupling devices for coupling a fluid conduit from the low pressure fluid source 14 to the low pressure inlet 204, it will be understood that the low pressure inlet 204 can include one or more threaded couplings, clamping surfaces, etc. as known to one skilled in the art disposed about or within the low pressure inlet 204 to facilitate coupling the low pressure inlet 204 to the low pressure fluid source 14.

The second end 220 also defines the outlet 208. In one example, the outlet 208 is defined as a cylindrical bore, which is defined substantially along a longitudinal axis L of the housing 202. While the outlet 208 is not illustrated herein as including coupling devices for coupling a fluid conduit from the outlet 208 to the consumer 18, it will be understood that the outlet 208 can include one or more threaded couplings, clamping surfaces, etc. as known to one skilled in the art disposed about or within the outlet 208 to facilitate coupling the outlet 208 to the consumer 18.

The top surface 222 defines the high pressure inlet 206. In one example, the high pressure inlet 206 is defined as a cylindrical bore, which is defined substantially offset from a central axis A that extends through the housing 202, with the axis A substantially perpendicular to the longitudinal axis L. While the high pressure inlet 206 is not illustrated herein as including coupling devices for coupling a fluid conduit from the high pressure fluid source 16 to the high pressure inlet 206, it will be understood that the high pressure inlet 206 can include one or more threaded couplings, clamping surfaces, etc. as known to one skilled in the art disposed about or within the high pressure inlet 206 to facilitate coupling the high pressure inlet 206 to the high pressure fluid source 16. The bottom surface 42 defines one of the one or more vent outlets 210, such as a vent outlet 210b. The vent outlet 210b is substantially circular, however, the vent outlet 210b can have any desired shape.

The one or more chambers 226 are defined within the housing 202. In one example, the housing 202 defines a first or mixing chamber 226a, a second or closing chamber 226b and a third or positioning chamber 226c. The mixing chamber 226a and the positioning chamber 226c comprise a first chamber of the housing 202, and the closing chamber 226b comprises a second chamber of the housing 202. The mixing chamber 226a is defined in the housing 202 so as to extend along the longitudinal axis L. The mixing chamber 226a is generally defined between the first end 218 and the second end 220. In one example, the mixing chamber 226a is defined in the housing 202 such that the mixing chamber 226a is substantially symmetric with respect to the axis A extending through the housing 202.

The mixing chamber 226a includes a first end 230 and a second end 232. The first end 230 is in fluid communication with the high pressure inlet 206 at a first end opening 230a. The second end 232 of the mixing chamber 226a is in fluid communication with the low pressure inlet 204 at a second end opening 232a based on a position of the check valve 214. As will be discussed, the check valve 214 selectively permits fluid communication between the low pressure inlet 204 and the mixing chamber 226a. The mixing chamber 226a is also in fluid communication with the outlet 208 at an opening 234 defined between the first end 230 and the second end 232. Generally, the opening 234 enables the high pressure fluid from the high pressure fluid source 16 and the low pressure fluid from the low pressure fluid source 14 to exit through the opening 234 into the outlet 208.

The closing chamber 226b is defined near the bottom surface 224 of the housing 202. The closing chamber 226b is substantially symmetric relative to the axis A. The closing chamber 226b is in fluid communication with the vent outlet 210b and with the one or more fluid passageways 228. The closing chamber 226b also receives a portion of the shutoff valve 216. The positioning chamber 226c is defined adjacent to the mixing chamber 226a. The positioning chamber 226c is substantially symmetric with respect to the axis A. The positioning chamber 226c is in fluid communication with the one or more fluid passageways 228, and receives a portion of the mixing system 212.

As will be discussed, the one or more fluid passageways 228 enable the control of the mixing system 212 and the shutoff valve 216. In one example, the one or more fluid passageways 228 comprise a first fluid passageway 228a, a second fluid passageway 228b, a third fluid passageway 228c, a fourth fluid passageway 228d and a fifth fluid passageway 228e. The first fluid passageway 228a is defined through the housing 202 near the first end 218. The first fluid passageway 228a includes an inlet 236 in fluid communication with the high pressure inlet 206, such that high pressure fluid from the high pressure fluid source 16 may flow into the first fluid passageway 228a. The first fluid passageway 228a also includes an outlet 238 in fluid communication with the second fluid passageway 228b and in communication with the actuator 22. Similar to that discussed with regard to FIGS. 1-6, the outlet 238 is sized to receive the ball 3-way valve 108 of the actuator 22, which enables or disables the flow of high pressure fluid through the first fluid passageway 228a into the second fluid passageway 228b. The second fluid passageway 228b includes an inlet 240, which is in fluid communication with the outlet 238 of the first fluid passageway 228a. The second fluid passageway 228b also includes an outlet 241, which is in fluid communication with the closing chamber 226b. The third fluid passageway 228c is in fluid communication with the outlet 238 of the first fluid passageway 228a and with the vent outlet 210a to enable excess fluid to vent into an area surrounding the mixing valve 200 based on a position of the ball 3-way valve 108 of the actuator 22.

The fourth fluid passageway 228d is in fluid communication with and is defined between the high pressure inlet 206 and the positioning chamber 226c. The fourth fluid passageway 228d receives a portion of the high pressure fluid from the high pressure inlet 206 and directs the flow of the high pressure fluid into the positioning chamber 226c to interact with the mixing system 212, as will be discussed in greater detail herein. The fifth fluid passageway 228e is in fluid communication with and is defined between the low pressure inlet 204 and the positioning chamber 226c. The fifth fluid passageway 228e receives a portion of the low pressure fluid from the low pressure inlet 204 and directs the flow of the low pressure fluid into the positioning chamber 226c to interact with the mixing system 212, as will be discussed in greater detail herein.

As discussed, the low pressure inlet 204 is defined through the second end 220 of the housing 202, and extends into the housing 202 such that the low pressure inlet 204 is in fluid communication with the fifth fluid passageway 228e and the mixing chamber 226a based on a position of the check valve 214. The high pressure inlet 206 is defined through the top surface 222 of the housing 202, and extends into the housing 202 such that the high pressure inlet 206 is in fluid communication with the fourth fluid passageway 228d and the mixing chamber 226a at the first end 230. The outlet 208 is defined through the second end 220 of the housing 202, and extends into the housing 202 such that the outlet 208 is in fluid communication with the mixing chamber 226a via the opening 234. The one or more vent outlets 210 are defined through the housing 202 such that the vent outlet 210b is in fluid communication with the closing chamber 226b and the vent outlet 210a is in fluid communication with the second fluid passageway 228b.

The mixing system 212 is coupled to and movable within the housing 202. In one example, the mixing system 212 includes a poppet valve 242, a piston 244, one or more biasing members 246, and one or more sealing members 248. The poppet valve 242 is coupled to the housing 202 so as to be disposed in the high pressure inlet 206. The poppet valve 242 comprises any suitable poppet valve known to one of skill in the art, and thus, will not be discussed in great detail herein. Briefly, however, the poppet valve 242 includes a valve stem 250, a valve seat 252 and a biasing member or spring 254. The valve stem 250 is coupled to the housing 202 and to the valve seat 252. The spring 254 surrounds the valve stem 250 and is positioned between the valve seat 252 and the housing 202. As is generally known, the valve stem 250 is movable relative to the housing 202 based on a pressure differential between the high pressure fluid source 16 and the low pressure fluid source 14. In one example, when the pressure differential between the high pressure inlet 206 and the low pressure inlet 204 reaches a predefined threshold, such as about 50 pounds per square inch differential (psid) to about 60 pounds per square inch differential (psid), the piston 244 moves the valve seat 252 to close the high pressure inlet 206, thereby preventing the flow of high pressure fluid into the mixing chamber 226a. The spring 254 generally maintains the valve seat 252 loaded or in a position against a rod 258 of the piston 244, and the piston 244 positions the valve seat 252. Generally, the poppet valve 242 is not coupled to the piston 244.

The piston 244 is received within the positioning chamber 226c and the high pressure inlet 206. The piston 244 is movable between a plurality of positions within the positioning chamber 226c based on a differential pressure as will be discussed in greater detail herein. The piston 244 includes a head 256 and the rod 258. The head 256 of the piston 244 is received and movable within the positioning chamber 226c. The head 256 is generally circular, however, the head 256 can have any desired shape configured to cooperate with the positioning chamber 226c. In this example, the head 256 has a diameter that can be substantially the same diameter as the positioning chamber 226c to substantially prevent leakage of fluid about the head 256 of the piston 244. The head 256 includes a first surface 260, a second surface 262 generally opposite the first surface 260 and a groove 264. The first surface 260 comprises a contact surface for contacting the fluid that enters the positioning chamber 226c from the fourth fluid passageway 228d. The second surface 262 is coupled to one of the one or more biasing members 246 and comprises a contact surface for contacting the fluid that enters the positioning chamber 226c from the fifth fluid passageway 228e. The groove 264 is defined between the first surface 260 and the second surface 262, and is sized to receive one of the one or more sealing members 248. The rod 258 interconnects the head 256 and the poppet valve 242 such that the head 256 and the poppet valve 242 move substantially in unison. The rod 258 is substantially cylindrical, however, the rod 258 can have any desired shape. The rod 258 extends through the housing 202 in a passage 202a defined between the mixing chamber 226a and the positioning chamber 226c.

The one or more biasing members 246 cooperate with the housing 202 to assist in the movement of the piston 244. In one example, the one or more biasing members 246 comprise a first spring 246a. Generally, the first spring 246a comprises a coil spring, however, the first spring 246a can comprise any suitable biasing member, such as a wave spring, leaf spring, etc. The first spring 246a is received within the positioning chamber 226c, so as to be positioned between the second surface 262 of the piston 244 and a second end 261 of the positioning chamber 226c. The first spring 246a has a spring force of about 30 pound force (lbf) to about 100 pound force (lbf) to bias the head 256 towards a first end 263 of the positioning chamber 226c when the piston 244 is in a first, initial position. As will be discussed further herein, in a second, final position, the spring force of the first spring 246a may be overcome by the movement of the piston 244, such that the first spring 246a is compressed by the head 256 of the piston 244.

The one or more sealing members 248 generally prevent leakage of fluid about various components of the mixing system 212. In one example, the one or more sealing members 248 comprise a first sealing member 248a and a second sealing member 248b. The first sealing member 248a and the second sealing member 248b comprise any suitable dynamic sealing member, such as elastomeric O-ring seals, polymer seals, carbon piston rings or metal, such as steel, piston rings. The first sealing member 248a has a diameter suitable to be received within the groove 264 of the head 256 of the piston 244 and is sized such that the first sealing member 248a substantially contacts a portion of the positioning chamber 226c to substantially prevent the flow of fluid about the head 256 of the piston 244. The second sealing member 248b has a diameter suitable to be positioned about the rod 258 and to be received within a groove 266 defined in the housing 202 along the passage 202a to substantially prevent the leakage of fluid out of the positioning chamber 226c and/or mixing chamber 226a along the rod 258.

The check valve 214 substantially prevents a backflow of fluid from the mixing chamber 226a into the low pressure inlet 204. In one example, the check valve 214 is coupled to the housing 202 so as to be disposed in the mixing chamber 226a adjacent to the second end opening 232a of the mixing chamber 226a. The check valve 214 comprises any suitable check valve 214 that prevents a flow of fluid, and in one example, includes a check valve stem 268 and a check valve seat 270. The check valve stem 268 is coupled to the housing 202 so as to be movable within the housing 202. In one example, the check valve stem 268 is received within a bore 202b defined in the housing 202 and includes a flange 268a at an end to retain the check valve stem 268 within the bore 202b. The check valve seat 270 is coupled to the check valve stem 268, and has a diameter sufficient to seal and close the second end opening 232a of the mixing chamber 226a to prevent the flow of fluid through the second end opening 232a. Generally, the check valve 214 is in a closed or seated position under the force of gravity, and is movable by the low pressure fluid in the low pressure inlet 204 to an opened or unseated position to enable the flow of low pressure fluid into the mixing chamber 226a. It should be noted that this check valve 214 may also be employed with the mixing valve 10, if desired.

The shutoff valve 216 is movable to enable or prevent a flow of fluid out of the mixing chamber 226a into the outlet 208. In one example, the shutoff valve 216 includes a poppet 272, a biasing member or spring 274 and one or more sealing members 276. The poppet 272 includes a piston valve poppet 278 and a piston 280, which are interconnected via a rod 282. The piston valve poppet 278 has a diameter suitable to seal or seat about the opening 234 to prevent the flow of fluid from the mixing chamber 226a into the outlet 208. The piston 280 of the poppet 272 is received and movable within the closing chamber 226b. The piston 280 is generally circular, however, the piston 280 can have any desired shape configured to cooperate with the closing chamber 226b. In this example, the piston 280 has a diameter that can be substantially the same diameter as the closing chamber 226b to substantially prevent leakage of fluid about the piston 280 of the poppet 272. The piston 280 includes a first surface 284, a second surface 286 generally opposite the first surface 284 and a groove 288. The first surface 284 comprises a contact surface for contacting the fluid that enters the closing chamber 226b via the second fluid passageway 228b. The second surface 286 is coupled to or in contact with the spring 274 and is coupled to the rod 282. The groove 288 is defined between the first surface 284 and the second surface 286, and is sized to receive one of the one or more sealing members 276. The rod 282 interconnects the piston 280 and the piston valve poppet 278 such that the piston 280 and the piston valve poppet 278 move substantially in unison. The rod 282 is substantially cylindrical; however, the rod 282 can have any desired shape. The rod 282 extends through the housing 202 in a passage 202c defined between the closing chamber 226b and the outlet 208.

The one or more sealing members 276 generally prevent leakage of fluid about various components of the shutoff valve 216. In one example, the one or more sealing members 276 comprise a first sealing member 276a and a second sealing member 276b. The first sealing member 276a and the second sealing member 276b comprise any suitable dynamic sealing member, such as elastomeric O-ring seals, polymer seals, carbon piston rings or metal, such as steel, piston rings. The first sealing member 276a has a diameter suitable to be received within the groove 288 of the piston 280 of the poppet 272 and is sized such that the first sealing member 276a substantially contacts a portion of the closing chamber 226b to substantially prevent the flow of fluid about the piston 280 of the poppet 272. The second sealing member 276b generally prevents leakage of fluid about the rod 282. The second sealing member 276b has a diameter suitable to be positioned about the rod 282 and to be received within a groove 289 defined in the housing 202 to substantially prevent the leakage of fluid out of the closing chamber 226b and/or the outlet 208 along the rod 282.

As discussed with regard to FIGS. 1-6, the actuator 22 controls the operation of the mixing valve 200. In this regard, the actuator 22 is responsive to one or more control signals received from the user input device 102 to enable or disable the flow of fluid from the outlet 208. Briefly, as the ball 3-way valve 108 is coupled to the armature 106, the movement of the armature 106 between the first position and the second position moves the ball 3-way valve 108. When the armature 106 is in the first position, the ball 3-way valve 108 is received in the outlet 238 of the first fluid passageway 228a, such that the fluid passageway defined by the first fluid passageway 228a and the second fluid passageway 228b is closed. In the first position, the second fluid passageway 228b is fluidly coupled to the third fluid passageway 228c to enable excess fluid to vent through the vent outlet 210a.

When the armature 106 is in the second position, such as when the one or more coils 104 are energized based on the receipt of the one or more control signals, the ball 3-way valve 108 is moved out of the outlet 238 of the first fluid passageway 228a, such that fluid flows from the first fluid passageway 228a to the second fluid passageway 228b, and the fluid passageway defined by the first fluid passageway 228a and the second fluid passageway 228b is open. The third fluid passageway 228c is blocked. The flow of fluid through the first fluid passageway 228a into and through the second fluid passageway 228b causes the fluid to enter the closing chamber 226b and apply a fluid force or pressure on the piston 280 of the poppet 272. The application of the fluid force or pressure on the piston 280 of the poppet 272 moves the poppet 272, and thus, the piston valve poppet 278 to close the opening 234 and thereby prevent the flow of fluid through the outlet 208.

In order to assemble the mixing valve 200, in one exemplary method, with the housing 20 formed, the first spring 246a is positioned within the housing 202 so as to bias against the second end 261 of the positioning chamber 226c. The poppet valve 242 is coupled to the housing 202, and the piston 244 is inserted into the housing 202 such that the head 256 is positioned within the positioning chamber 226c. It should be noted that the housing 202 can comprise multiple pieces, which can be coupled together to aid in assembly of the mixing valve 200. Generally, the second sealing member 248b is positioned within the housing 202 prior to the insertion of the rod 258 within the housing 202, and the first sealing member 248a is coupled to the head 256 of the piston 244 prior to the insertion of the piston 244 into the housing 202. The check valve 214 is also coupled to the housing 202, and the shutoff valve 216 is coupled to the housing 202 such that the poppet 272, with the first sealing member 276a positioned about the piston 280 of the poppet 272, is received within the closing chamber 226b. The second sealing member 276b is also coupled to the groove 289 so as to surround the rod 282 when the poppet 272 is coupled to the housing 202 and the spring 274 is positioned within the closing chamber 226b to bias against the poppet 272. The actuator 22 is also coupled to the housing 202, such that the ball 3-way valve 108 is received within the outlet 238 of the first fluid passageway 228a. The check valve 214 is generally positioned such that the force of gravity will assist in closing the check valve 214. The piston 244 is not coupled to the poppet valve 242, but maintains intimate contact with the spring 254 unless seated in a closed position.

With the mixing valve 200 assembled, the mixing valve 200 is fluidly coupled to the low pressure fluid source 14, the high pressure fluid source 16 and the consumer 18 through one or more fluid conduits as known to one skilled in the art. The mixing valve 200 is in a first, initial position prior to the receipt of fluid from the low pressure fluid source 14 and/or high pressure fluid source 16, and the one or more coils 104 of the actuator 22 are de-energized. In the first, initial position, the poppet valve 242 is unsealed or unseated such that high pressure fluid flows into the mixing chamber 226a and the check valve 214 is in the closed or seated position to enable substantially only high pressure fluid flow out of the outlet 208. As the differential pressure between the high pressure fluid source 16 and the low pressure fluid source 14 increases, the high pressure fluid flows through the fourth fluid passageway 228d and acts on the first surface 260 of the head 256 of the piston 244. This high pressure fluid is opposed by the fluid from the low pressure fluid source 14 acting on the second surface 262 of the piston 244. As the differential pressure (the difference in pressure between the high pressure fluid source 16 and the low pressure fluid source 14) increases, the piston 244 translates against the first spring 246a to slowly close the poppet valve 242. As the piston 244 begins to move in the positioning chamber 226c, the rod 258 retracts allowing the poppet valve 242 to translate towards the first end opening 230a of the mixing chamber 226a to enable both high pressure fluid flow and low pressure fluid flow out of the outlet 208. The continued increase in differential pressure from the high pressure fluid source 16 minus the low pressure fluid source 14 causes the piston 244 to fully overcome the force of the first spring 264a, which causes the poppet valve 242 to be fully extended and closed or seat against the first end opening 230a of the mixing chamber 226a, which causes substantially only low pressure fluid flow out of the outlet 208.

Upon receipt of the one or more control signals from the user input device 102, for example, the one or more coils 104 are energized. By energizing the one or more coils 104, the armature 106 is drawn up between the one or more coils 104, thereby moving the ball 3-way valve 108 from the outlet 238 of the first fluid passageway 228a. By moving the ball 3-way valve 108 from the outlet 238 of the first fluid passageway 228a, the high pressure fluid from the high pressure inlet 206 flows through the first fluid passageway 228a into the second fluid passageway 228b, and flows from the second fluid passageway 228b into the closing chamber 226b. The high pressure fluid flow in the closing chamber 226b acts on the piston 280 of the poppet 272, and overcomes the spring force of the spring 274 to move the piston valve poppet 278 to seat against the opening 234, thereby preventing the flow of fluid into the outlet 208. The movement of the ball 3-way valve 108 out of the outlet 238 of the first fluid passageway 228a blocks the third fluid passageway 228c to prevent high pressure fluid from exiting the mixing valve 200 through the vent outlet 210a. In addition, excess fluid or leakage about the first sealing member 276a may exit the mixing valve 200 through the vent outlet 210b, which is in fluid communication with the closing chamber 226b.

Figure 8:
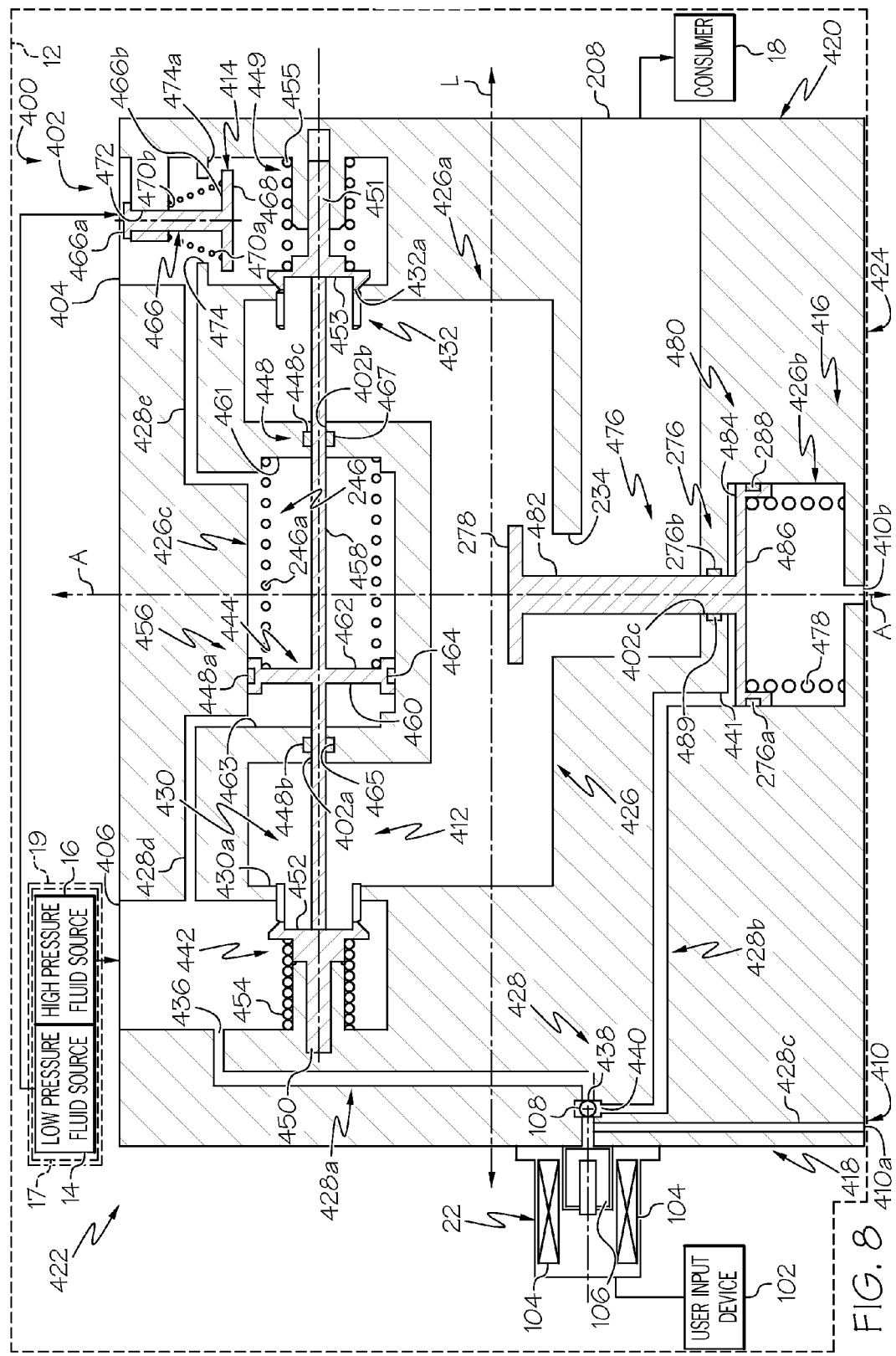
FIG. 8 is a schematic cross-sectional illustration of a pneumatic mixing valve in accordance with various embodiments.

With reference now to FIG. 8, a schematic illustration of a mixing valve 400 is shown. As the mixing valve 400 can be similar to the mixing valve 10 discussed with regard to FIGS. 1-6 and the mixing valve 200 discussed with regard to FIG. 7, only the differences between the mixing valve 10, the mixing valve 200 and the mixing valve 400 will be discussed in detail herein, with the same reference numerals used to denote the same or substantially similar components. The mixing valve 400 can be employed with the mobile platform 12, such as a bus, motorcycle, train, motor vehicle, marine vessel, aircraft, rotorcraft and the like, to provide elevated temperature fluid to a downstream consumer. With reference to FIG. 8, the mixing valve 400 is in fluid communication with the low pressure fluid source 14 and the high pressure fluid source 16, and is in fluid communication with the consumer 18, such as an anti-icing system and/or an environmental control system associated with the mobile platform 12.

The mixing valve 400 uses differential pressure to mix low pressure fluid received from the low pressure fluid source 14 with high pressure fluid received from the high pressure fluid source 16 to output fluid with a suitable temperature for use by the consumer 18. In one example, the mixing valve 400 includes a housing 402 and the actuator 22. As discussed with regard to FIGS. 1-6, the actuator 22 is responsive to user input to control the operation of the mixing valve 400. While certain conduits are illustrated herein for enabling fluid communication between various components and the mixing valve 400, it will be understood that the arrangement illustrated herein is merely exemplary. In this regard, any number of conduits and fluid couplings can be employed to provide fluid communication or fluid coupling between the various components and the mixing valve 400 as known to one skilled in the art. Thus, the arrangement of conduits contained herein is merely exemplary.

With continued reference to FIG. 8, the housing 402 defines a low pressure inlet 404, a high pressure inlet 406, the outlet 208 and one or more vent outlets 410. The housing 402 also includes a mixing system 412, a check valve 414 and a shutoff valve 416. While not specifically illustrated herein, the housing 402 is substantially cylindrical, but it will be understood that the housing 402 may have any desired shape. Moreover, the components and/or fluid couplings associated with the mixing valve 400 can be contained within any suitable housing, including multiple housings. The housing 402 is composed of any suitable material, such as a metal, metal alloy or reinforced polymeric material. For example, the housing 402 is composed of aluminum. In one example, the housing 402 includes a first end 418, a second end 420, a first or top surface 422, a second or bottom surface 424, one or more chambers 426 and one or more fluid passageways 428. It should be noted that the location of the top surface 422 and the bottom surface 424 on the housing 402 is merely exemplary as the top surface 422 and the bottom surface 424 may be defined at any desired location along the body or perimeter of the housing 402.

The actuator 22 is coupled to the first end 418. The second end 420 is opposite the first end 418. The second end 420 defines the outlet 208. In one example, the outlet 208 is defined as a cylindrical bore, which is defined substantially along a longitudinal axis L of the housing 402. While the outlet 208 is not illustrated herein as including coupling devices for coupling a fluid conduit from the outlet 208 to the consumer 18, it will be understood that the outlet 208 can include one or more threaded couplings, clamping surfaces, etc. as known to one skilled in the art disposed about or within the outlet 208 to facilitate coupling the outlet 208 to the consumer 18.

The top surface 422 defines the low pressure inlet 404 and the high pressure inlet 406. In one example, the high pressure inlet 406 is defined as a cylindrical bore, which is defined substantially offset from a central axis A that extends through the housing 402, with the axis A substantially perpendicular to the longitudinal axis L. While the high pressure inlet 406 is not illustrated herein as including coupling devices for coupling a fluid conduit from the high pressure fluid source 16 to the high pressure inlet 406, it will be understood that the high pressure inlet 406 can include one or more threaded couplings, clamping surfaces, etc. as known to one skilled in the art disposed about or within the high pressure inlet 406 to facilitate coupling the high pressure inlet 406 to the high pressure fluid source 16. The low pressure inlet 404 is defined as a cylindrical bore, which is defined substantially offset from the axis A of the housing 402. While the low pressure inlet 404 is not illustrated herein as including coupling devices for coupling a fluid conduit from the low pressure fluid source 14 to the low pressure inlet 404, it will be understood that the low pressure inlet 404 can include one or more threaded couplings, clamping surfaces, etc. as known to one skilled in the art disposed about or within the low pressure inlet 404 to facilitate coupling the low pressure inlet 404 to the low pressure fluid source 14.

The bottom surface 424 defines one of the one or more vent outlets 410, such as a vent outlet 410*a* and a vent outlet 410*b*. The vent outlet 410*a* is substantially circular; however, the vent outlet 410*a* can have any desired shape. The vent outlet 410*b* is substantially circular; however, the vent outlet 410*b* can have any desired shape.

The one or more chambers 426 are defined within the housing 402. In one example, the housing 202 defines a first or mixing chamber 426*a*, a second or closing chamber 426*b* and a third or positioning chamber 426*c*. The mixing chamber 426*a* and the positioning chamber 426*c* comprise a first chamber of the housing 402, and the closing chamber 426*b* comprises a second chamber of the housing 402. The mixing chamber 426*a* is defined in the housing 402 so as to extend along the longitudinal axis L. The mixing chamber 426*a* is generally defined between the first end 418 and the second end 420. In one example, the mixing chamber 426*a* is defined in the housing 402 such that the mixing chamber 426*a* is symmetric with respect to an axis A extending through the housing 402.

The mixing chamber 426*a* includes a first end 430 and a second end 432. The first end 430 is in fluid communication with the high pressure inlet 406 and the mixing system 412 at a first end opening 430*a*. The second end 432 of the mixing chamber 426*a* is in fluid communication with the low pressure inlet 404 and the mixing system 412 at a second end opening 432*a*. The mixing chamber 426*a* is also in fluid communication with the outlet 208 at the opening 234 defined between the first end 430 and the second end 432. Generally, the opening 234 enables the high pressure fluid from the high pressure fluid source 16 and the low pressure fluid from the low pressure fluid source 14 to exit through the opening 234 into the outlet 208.

The closing chamber 426*b* is defined near the bottom surface 424 of the housing 402. The closing chamber 426*b* is substantially symmetric relative to the axis A. The closing chamber 426*b* is in fluid communication with the vent outlet 410*b* and with the one or more fluid passageways 428. The closing chamber 426*b* also receives a portion of the shutoff valve 416. The positioning chamber 426*c* is defined adjacent to the mixing chamber 426*a*. The positioning chamber 426*c* is substantially symmetric with respect to the axis A. The positioning chamber 426*c* is in fluid communication with the one or more fluid passageways 428, and receives a portion of the mixing system 412.

As will be discussed, the one or more fluid passageways 428 enable the control of the mixing system 412 and the shutoff valve 416. In one example, the one or more fluid passageways 428 comprise a first fluid passageway 428*a*, a second fluid passageway 428*b*, a third fluid passageway 428*c*, a fourth fluid passageway 428*d* and a fifth fluid passageway 428*e*. The first fluid passageway 428*a* is defined through the housing 402 near the first end 418. The first fluid passageway 428*a* includes an inlet 436 in fluid communication with the high pressure inlet 406, such that high pressure fluid from the high pressure fluid source 16 may flow into the first fluid passageway 428*a*. The first fluid passageway 428*a* also includes an outlet 438 in fluid communication with the second fluid passageway 428*b* and in communication with the actuator 22. Similar to that discussed with regard to FIGS. 1-6, the outlet 438 is sized to receive the ball 3-way valve 108 of the actuator 22, which enables or disables the flow of high pressure fluid through the first fluid passageway 428a into the second fluid passageway 428b. The second fluid passageway 428b includes an inlet 440, which is in fluid communication with the outlet 438 of the first fluid passageway 428a. The second fluid passageway 428b also includes an outlet 441, which is in fluid communication with the closing chamber 426b. The third fluid passageway 428c is in fluid communication with the outlet 438 of the first fluid passageway 428a and with the vent outlet 410a to enable excess fluid to vent into an area surrounding the mixing valve 400 based on a position of the ball 3-way valve 108 of the actuator 22.

The fourth fluid passageway 428d is in fluid communication with and is defined between the high pressure inlet 406 and the positioning chamber 426c. The fourth fluid passageway 428d receives a portion of the high pressure fluid from the high pressure inlet 406 and directs the flow of the high pressure fluid into the positioning chamber 426c to interact with the mixing system 412, as will be discussed in greater detail herein. The fifth fluid passageway 428e is in fluid communication with and is defined between the low pressure inlet 404 and the positioning chamber 426c. The fifth fluid passageway 428e receives a portion of the low pressure fluid from the low pressure inlet 404 and directs the flow of the low pressure fluid into the positioning chamber 426c to interact with the mixing system 412, as will be discussed in greater detail herein.

As discussed, the low pressure inlet 404 is defined through the top surface 422 of the housing 402, and extends into the housing 402 such that the low pressure inlet 404 is in fluid communication with the check valve 414, the fifth fluid passageway 428e and the mixing system 412. The high pressure inlet 406 is defined through the top surface 422 of the housing 402, and extends into the housing 402 such that the high pressure inlet 406 is in fluid communication with the fourth fluid passageway 228d and the mixing system 412. The outlet 208 is defined through the second end 420 of the housing 402, and extends into the housing 402 such that the outlet 408 is in fluid communication with the mixing chamber 426a via the opening 234. The one or more vent outlets 410 are defined through the housing 402 such that the vent outlet 410b is in fluid communication with the closing chamber 426b and the vent outlet 410a is in fluid communication with the third fluid passageway 428c and the first fluid passageway 428a.

The mixing system 412 is coupled to and movable within the housing 402. In one example, the mixing system 412 includes a first poppet valve 442, a piston 444, the one or more biasing members 246, one or more sealing members 448 and a second poppet valve 449. The first poppet valve 442 is coupled to the housing 402 so as to be disposed in the high pressure inlet 406. The first poppet valve 442 comprises any suitable poppet valve known to one of skill in the art, and thus, will not be discussed in great detail herein. Briefly, however, the first poppet valve 442 includes a valve stem 450, a valve seat 452 and a biasing member or spring 454. The valve stem 450 is coupled to the housing 402 and to the valve seat 452. It should be noted that the valve seat 452 may include one or more apertures, similar to the channels 86, to control the flow of fluid. The spring 454 surrounds the valve stem 450 and is positioned between the valve seat 452 and the housing 402. As is generally known, the valve stem 450 is movable relative to the housing 402 based on a pressure differential between the high pressure fluid source 16 and the low pressure fluid source 14. In one example, when the pressure differential between the high pressure inlet 406 and the low pressure inlet 404 reaches a predefined threshold, such as about 50 pounds per square inch differential (psid) to about 60 pounds per square inch differential (psid) the piston 444 moves the valve seat 452 to close the high pressure inlet 406, thereby preventing the flow of high pressure fluid into the mixing chamber 426a. The spring 454 and a spring 455 of the second poppet valve 449 cooperate to keep the first poppet valve 442 and the second poppet valve 449 in contact with a rod 458 of the piston 444.

The piston 444 is received within the positioning chamber 426c. The piston 444 is movable between a plurality of positions within the positioning chamber 426c as will be discussed in greater detail herein. The piston 444 includes a head 456 and the rod 458. The head 456 of the piston 444 is received and movable within the positioning chamber 426c. The head 456 is generally circular, however, the head 456 can have any desired shape configured to cooperate with the positioning chamber 426c. In this example, the head 456 has a diameter that can be substantially the same diameter as the positioning chamber 426c to substantially prevent leakage of fluid about the head 456 of the piston 444. The head 456 includes a first surface 460, a second surface 462 generally opposite the first surface 460 and a groove 464. The first surface 460 comprises a contact surface for contacting the fluid that enters the positioning chamber 426c from the fourth fluid passageway 428d. The second surface 462 is coupled to one of the one or more biasing members 246 and comprises a contact surface for contacting the fluid that enters the positioning chamber 426c from the fifth fluid passageway 428e. The groove 464 is defined between the first surface 460 and the second surface 462, and is sized to receive one of the one or more sealing members 448. The rod 458 interconnects the head 456, the first poppet valve 442 and the second poppet valve 449 such that the head 456, the first poppet valve 442 and the second poppet valve 449 move substantially in unison. The rod 458 is substantially cylindrical, however, the rod 458 can have any desired shape. The rod 458 extends through the housing 402 in a passage 402a defined between the mixing chamber 426a and the positioning chamber 426c and a passage 402b defined between the mixing chamber 426a and the positioning chamber 426c.

The one or more biasing members 246 cooperate with the housing 402 to assist in the movement of the piston 444. In one example, the one or more biasing members 246 comprises the first spring 246a. The first spring 246a is received within the positioning chamber 426c, so as to be positioned between the second surface 462 of the piston 444 and a second end 461 of the positioning chamber 426c. The first spring 246a biases the head 456 towards a first end 463 of the positioning chamber 426c when the piston 444 is in a first, initial position. As will be discussed further herein, in a second, final position, the spring force of the first spring 446a may be overcome by the movement of the piston 444, such that the first spring 246a is compressed by the head 456 of the piston 444.

The one or more sealing members 448 generally prevent leakage of fluid about various components of the mixing system 412. In one example, the one or more sealing members 448 comprise a first sealing member 448a, a second sealing member 448b and a third sealing member 448c. The first sealing member 248a, the second sealing member 448b and the third sealing member 448c comprise any suitable dynamic sealing member, such as elastomeric O-ring seals, polymer seals, carbon piston rings or metal piston rings. The first sealing member 448a has a diameter suitable to be received within the groove 464 of the head 456 of the piston 444 and is sized such that the first sealing member 448a substantially contacts a portion of the positioning chamber 426c to substantially prevent the flow of fluid about the head 456 of the piston 444. The second sealing member 448b has a diameter suitable to be positioned about the rod 458 and to be received within a groove 465 defined in the housing 402 along the passage 402a to substantially prevent the leakage of fluid out of the positioning chamber 426c and/or mixing chamber 426a along the rod 458. The third sealing member 448c has a diameter suitable to be positioned about the rod 458 and to be received within a groove 467 defined in the housing 402 along the passage 402b to substantially prevent the leakage of fluid out of the positioning chamber 426c and/or mixing chamber 426a along the rod 458.

The second poppet valve 449 is coupled to the housing 402 so as to be disposed in the low pressure inlet 404. The second poppet valve 449 comprises any suitable poppet valve known to one of skill in the art, and thus, will not be discussed in great detail herein. Briefly, however, the second poppet valve 449 includes a valve stem 451, a valve seat 453 and a biasing member or the spring 455. The valve stem 451 is coupled to the housing 402 and to the valve seat 453. It should be noted that the valve seat 453 may include one or more apertures, similar to the channels 86, to control the flow of fluid. The spring 455 surrounds the valve stem 451 and is positioned between the valve seat 453 and the housing 402. As is generally known, the valve stem 451 is movable relative to the housing 402 based on a pressure differential.

The check valve 414 substantially prevents a backflow of fluid from the mixing chamber 426a into the low pressure inlet 404. In one example, the check valve 414 is coupled to the housing 402 so as to be disposed in the low pressure inlet 404 adjacent to the second end opening 432a of the mixing chamber 426a. Generally, the check valve 414 is movable within the low pressure inlet 404 to enable or disable a flow of fluid through the low pressure inlet 404. The check valve 414 includes a check valve stem 466, a check valve seat 468 and a biasing member or spring 470.

The check valve stem 466 includes a first end 466a and a second end 466b. The first end 466a is coupled to the housing 402 in a cavity 472 defined in the housing 402. The first end 466a is coupled to the housing 402 so as to be movable within the cavity 472 to enable the check valve seat 468 to seat or unseat against an opening 474 defined in the housing 402 within the low pressure inlet 404. Generally, the check valve stem 466 is cylindrical, however, the check valve stem 466 can have any desired shape.

The check valve seat 468 is coupled to the second end 466b of the check valve stem 466. The check valve seat 468 may be separate and discrete from the check valve stem 466 or may be integrally formed with the check valve stem 466 if desired. The check valve seat 468 is annular or circular, and has a diameter sized to seat or seal against the opening 474 defined in the housing 402. Generally, the check valve seat 468 is seated against a surface 474a that surrounds the opening 474 to seal and thereby prevent the flow of fluid through the low pressure inlet 404 and the flow of fluid back into the low pressure inlet 404.

The spring 470 is coupled about the check valve stem 466 such that the check valve stem 466 extends through or passes through a diameter defined by the spring 470. The spring 470 may be conical in shape, such that the spring 470 tapers from a first end 470a to a second end 470b. The spring 470 is illustrated as a coil spring, however, the spring 470 can comprise any suitable biasing member. The first end 470a of the spring 470 is coupled to the check valve seat 468, and the second end 470b is coupled to the housing 402 adjacent to the cavity 472. The spring 470 has a spring force of about 1 pound force (lbf) to about 5 pound force (lbf), such that the spring 470 biases the check valve seat 468 outward, away from the opening 474 in a rest position. When the force of the spring 470 is overcome, due to fluid pressure and flow for example, the spring 470 is compressed by the check valve seat 468 and the check valve stem 466 moves or translates linearly within the cavity 472 until the check valve seat 468 is seated or sealed against the opening 474.

The shutoff valve 416 is movable to enable or prevent a flow of fluid out of the mixing chamber 426a into the outlet 208. In one example, the shutoff valve 416 includes a piston 476, a biasing member or spring 478 and the one or more sealing members 276. The piston 476 includes the piston valve poppet 278 and a head 480, which are interconnected via a rod 482. The piston valve poppet 278 has a diameter suitable to seal or seat about the opening 234 to prevent the flow of fluid from the mixing chamber 426a into the outlet 208. The head 480 of the piston 476 is received and movable within the closing chamber 426b. The head 480 is generally circular, however, the head 480 can have any desired shape configured to cooperate with the closing chamber 426b. In this example, the head 480 has a diameter that can be substantially the same diameter as the closing chamber 426b to substantially prevent leakage of fluid about the head 480 of the piston 476. The head 480 includes a first surface 484, a second surface 486 generally opposite the first surface 484 and the groove 288. The first surface 484 comprises a contact surface for contacting the fluid that enters the closing chamber 426b via the second fluid passageway 428b and is coupled to the rod 482. The second surface 486 is coupled to or in contact with the spring 478. The groove 288 is defined between the first surface 484 and the second surface 486, and is sized to receive one of the one or more sealing members 276. The rod 482 interconnects the head 480 and the piston valve poppet 278 such that the head 480 and the piston valve poppet 278 move substantially in unison. The rod 482 is substantially cylindrical, however, the rod 482 can have any desired shape. The rod 482 extends through the housing 402 in a passage 402c defined between the closing chamber 426b and the outlet 208.

The one or more sealing members 276 generally prevent leakage of fluid about various components of the shutoff valve 416. In one example, the one or more sealing members 276 comprise the first sealing member 276a and the second sealing member 276b. The first sealing member 276a has a diameter suitable to be received within the groove 288 of the head 480 of the piston 476 and is sized such that the first sealing member 276a substantially contacts a portion of the closing chamber 426b to substantially prevent the flow of fluid about the head 480 of the piston 476. The second sealing member 276b generally prevents leakage of fluid about the rod 482. The second sealing member 276b has a diameter suitable to be positioned about the rod 482 and to be received within a groove 489 defined in the housing 402 to substantially prevent the leakage of fluid out of the closing chamber 426b and/or the outlet 208 along the rod 482.

As discussed with regard to FIGS. 1-6, the actuator 22 controls the operation of the mixing valve 400. In this regard, the actuator 22 is responsive to one or more control signals received from the user input device 102 to enable or disable the flow of fluid from the outlet 208. Briefly, as the ball 3-way valve 108 is coupled to the armature 106, the movement of the armature 106 between the first position and the second position moves the ball 3-way valve 108. When the armature 106 is in the first position, the ball 3-way valve 108 is received in the outlet 438 of the first fluid passageway 428a, such that the flow of fluid into the second fluid passageway 428b is prevented and the fluid passageway defined by the first fluid passageway 428a and the second fluid passageway 428b is closed. In this position, the second fluid passageway 428b is fluidly coupled to the third fluid passageway 428c to enable excess fluid to exit the housing 402 via the vent outlet 410a. When the armature 106 is in the second position, such as when the one or more coils 104 are energized based on the receipt of the one or more control signals, the ball 3-way valve 108 is moved out of the outlet 438 of the first fluid passageway 428a, such that fluid flows from the first fluid passageway 428a to the second fluid passageway 428b, and the fluid passageway defined by the first fluid passageway 428a and the second fluid passageway 428b is open. The flow of fluid through the first fluid passageway 428a into and through the second fluid passageway 428b causes the fluid to enter the closing chamber 426b and apply a fluid force or pressure on the head 480 of the piston 476. The application of the fluid force or pressure on the head 480 of the piston 476 moves the piston 476, and thus, the piston valve poppet 278 to close the opening 234 and thereby prevent the flow of fluid through the outlet 208.

In order to assemble the mixing valve 400, in one exemplary method, with the housing 402 formed, the first poppet valve 442 and the second poppet valve 449 are coupled to the housing 402, and the piston 444 is inserted into the housing 402 such that the head 456 is positioned within the positioning chamber 426c. It should be noted that although the first poppet valve 442, piston 444, the rod 458 and the second poppet valve 449 are illustrated and described herein as comprising a uniform or single piece part, one or more of the first poppet valve 442, piston 444, the rod 458 and the second poppet valve 449 may be separately formed and coupled together to form the mixing system 412 to facilitate the assembly of the mixing system 412 within the housing 402. Moreover, the housing 402 can comprise multiple pieces, which can be coupled together to aid in assembly of the mixing valve 400. Generally, the second sealing member 448b is positioned within the housing 402 prior to the insertion of the rod 458 within the housing 402, and the first sealing member 448a is coupled to the head 456 of the piston 444 prior to the insertion of the piston 444 into the housing 402. The check valve 414 is also coupled to the housing 402, and the shutoff valve 416 is coupled to the housing 402 such that the piston 476, with the first sealing member 276a positioned about the head 480 of the piston 476, is received within the closing chamber 426b. The second sealing member 276b is also coupled to the groove 489 so as to surround the rod 482 when the piston 476 is coupled to the housing 402 and the spring 478 is positioned within the closing chamber 426b to bias against the piston 476. The actuator 22 is also coupled to the housing 402, such that the ball 3-way valve 108 is received within the outlet 438 of the first fluid passageway 428a.

With the mixing valve 400 assembled, the mixing valve 400 is fluidly coupled to the low pressure fluid source 14, the high pressure fluid source 16 and the consumer 18 through one or more fluid conduits as known to one skilled in the art. The mixing valve 400 is in a first, initial position prior to the receipt of fluid from the low pressure fluid source 14 and/or high pressure fluid source 16, and the one or more coils 104 of the actuator 22 are de-energized. In the first, initial position, the first poppet valve 442 is unsealed or unseated such that high pressure fluid flows into the mixing chamber 226a and the second poppet valve 449 is in the closed or seated position to enable substantially only high pressure fluid flow out of the outlet 208. The check valve 414 is opened or unseated, and the shutoff valve 416 is also open or unseated. As the differential pressure between the high pressure from the high pressure fluid source 16 and the low pressure from the low pressure fluid source 14 increases, the high pressure fluid flows through the fourth fluid passageway 428d and acts on the first surface 460 of the head 456 of the piston 444. This high pressure fluid is opposed by the fluid from the low pressure fluid source 14 acting on the second surface 462 of the piston 444. As the differential pressure (the difference in pressure between the high pressure fluid source 16 and the low pressure fluid source 14) increases, the piston 444 translates against the first spring 246a to slowly close the first poppet valve 442. As the piston 444 begins to move in the positioning chamber 426c, the piston 444 moves the first poppet valve 442 towards the first end opening 430a of the mixing chamber 426a and moves the second poppet valve 449 towards the second end 420 of the housing 402 to enable both high pressure fluid flow and low pressure fluid flow into the mixing chamber 426a and out of the outlet 208. The continued increase in pressure from the high pressure fluid source 16 minus the low pressure fluid source 14 causes the piston 444 to overcome the force of the first spring 246a, which causes the first poppet valve 442 to be fully extended and close or seat against the first end opening 430a of the mixing chamber 426a, which causes the second poppet valve 449 to overcome the force of the spring 455 and move the second poppet valve 449 into a fully opened position such that substantially only low pressure fluid flows into the mixing chamber 426a and out of the outlet 208.

Upon receipt of the one or more control signals from the user input device 102, the one or more coils 104 are energized. By energizing the one or more coils 104, the armature 106 is drawn up between the one or more coils 104, thereby moving the ball 3-way valve 108 from the outlet 438 of the first fluid passageway 428a. By moving the ball 3-way valve 108 from the outlet 438 of the first fluid passageway 428a, the flow of fluid through the second fluid passageway 428b to the third fluid passageway 428c and out of the vent outlet 410a is blocked. The high pressure fluid from the high pressure inlet 406 flows through the first fluid passageway 428a into the second fluid passageway 428b, and flows from the second fluid passageway 428b into the closing chamber 426b. The high pressure fluid flow in the closing chamber 426b acts on the head 480 of the piston 476, and overcomes the spring force of the spring 478 to move the piston valve poppet 278 to seat against the opening 234, thereby preventing the flow of fluid into the outlet 208. The movement of the ball 3-way valve 108 out of the outlet 438 of the first fluid passageway 428a also opens the third fluid passageway 428c to enable excess high pressure fluid to exit the mixing valve 400 through the vent outlet 410b. In addition, excess high pressure fluid may exit the mixing valve 400 through the vent outlet 410a, which is in fluid communication with the closing chamber 426b when the one or more coils 104 of the actuator 22 are de-energized.

Thus, the mixing valves 10, 200, 400 of the present disclosure provide operating positions that allow substantially only a high pressure fluid flow, a mixture of high pressure fluid flow and low pressure fluid flow and substantially only a low pressure fluid flow based on differential pressure. By providing only a high pressure fluid flow initially, the mixing valves 10, 200, 400 enable the low pressure fluid to reach a suitable temperature. As the pressure and temperature of the high pressure fluid and the low pressure fluid increase, the mixing valves 10, 200, 400 enable the mixture of high pressure fluid and low pressure fluid. By providing a mixture of high pressure fluid and low pressure fluid, the mixing valves 10, 200, 400 improve the efficiency of the high pressure fluid source 16 by reducing the bleed of the high pressure fluid. Once the low pressure fluid has reached a suitable temperature, the mixing valves 10, 200, 400 enable substantially only low pressure fluid to flow to the consumer 18, thereby eliminating the need to bleed high pressure fluid from the high pressure fluid source 16, which further improves efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A pneumatic mixing valve comprising:
   a housing that defines a first inlet, a second inlet and an outlet, the first inlet adapted to be coupled to a first fluid source and the second inlet adapted to be coupled to a second fluid source;
   the housing defining a first chamber fluidly separated from a second chamber, the first chamber in fluid communication with the first inlet, the second inlet and the outlet;
   a mixing system at least partially disposed in the first chamber, the mixing system including a piston that is movable by at least one of the first fluid and the second fluid;
   a check valve coupled to the housing adjacent to the outlet that seals against an opening defined in the housing to prevent a flow of fluid back into the first chamber;
   the housing defining a fluid passageway that extends from near the first inlet to the second chamber; and
   an actuator that is movable between a first position and a second position, and in the first position the fluid passageway is closed such that the outlet is open, and in the second position, the fluid passageway is open such that the outlet is closed.

2. The pneumatic mixing valve of claim 1, wherein the first chamber comprises a mixing chamber spaced apart from a positioning chamber.

3. The pneumatic mixing valve of claim 1, wherein the mixing system further comprises a piston coupled to a sleeve via a rod, and the piston is received within the second chamber and the sleeve is received with the first chamber.

4. The pneumatic mixing valve of claim 3, wherein the outlet includes a first opening spaced apart from a second opening, and the sleeve is movable by at least one of the first fluid and the second fluid based on a differential pressure to allow at least one of the first fluid and the second fluid to exit at least one of the first opening and the second opening.

5. The pneumatic mixing valve of claim 4, wherein the sleeve includes a first portion separated from a second portion by a support, and the first portion is in fluid communication with the first inlet and the second portion is in fluid communication with the second inlet.

6. The pneumatic mixing valve of claim 5, wherein the first portion includes a first channel that aligns with the first opening to enable the first fluid to exit into the outlet, and the second portion includes a second channel that aligns with the second opening to enable the second fluid to exit into the outlet.

7. The pneumatic mixing valve of claim 1, wherein the fluid passageway comprises a first fluid passageway and a second fluid passageway, the first fluid passageway having an inlet in fluid communication with the first inlet and a first outlet in communication with a third inlet of the second fluid passageway, the second fluid passageway having a second outlet in fluid communication with the second chamber and a portion of the actuator is received in the first outlet of the first fluid passageway to close the fluid passageway.

8. A pneumatic mixing valve comprising:
   a housing that defines a first inlet, a second inlet and an outlet, the first inlet to be coupled to a first fluid source and the second inlet to be coupled to a second fluid source, the second fluid source having fluid with a pressure different than a pressure of a fluid of the first fluid source;
   the housing defining a first chamber fluidly separated from a second chamber, the first chamber in fluid communication with the first inlet, the second inlet and the outlet;
   a mixing system including a piston coupled to a sleeve by a rod, the sleeve disposed in the first chamber and movable by at least one of the first fluid and the second fluid based on a differential pressure, and the piston disposed in the second chamber and movable by the first fluid;
   a check valve disposed in the outlet that prevents a flow of fluid into the outlet;
   the housing defining a fluid passageway that extends from near the first inlet to the second chamber; and
   an actuator having a ball three-way valve that is movable between a first position and a second position, in the first position the fluid passageway is closed, and in the second position the fluid passageway is open such that the outlet is closed by the movement of the piston in the second chamber.

9. The pneumatic mixing valve of claim 8, wherein the outlet includes a first opening spaced apart from a second opening, and the sleeve is movable by at least one of the first fluid and the second fluid to allow at least one of the first fluid and the second fluid to exit at least one of the first opening and the second opening.

10. The pneumatic mixing valve of claim 9, wherein the sleeve includes a first portion separated from a second portion by a support, and the first portion is in fluid communication with the first inlet and the second portion is in fluid communication with the second inlet.

11. The pneumatic mixing valve of claim 10, wherein the first portion includes a first channel that aligns with the first opening to enable the first fluid to exit into the outlet, and the second portion includes a second channel that aligns with the second opening to enable the second fluid to exit into the outlet.

12. The pneumatic mixing valve of claim 9, wherein the check valve seats against an opening defined in the housing adjacent to the second opening to prevent a flow of fluid through the second opening of the outlet.

13. The pneumatic mixing valve of claim 8, wherein the fluid passageway comprises a first fluid passageway and a second fluid passageway, the first fluid passageway having an inlet in fluid communication with the first inlet and a first outlet in communication with a third inlet of the second fluid passageway, the second fluid passageway having a second outlet in fluid communication with the second chamber and the ball three-way valve of the actuator is received in the first outlet of the first fluid passageway to close the fluid passageway.

14. A pneumatic mixing valve comprising:
a housing that defines a first inlet, a second inlet and an outlet, the first inlet adapted to be coupled to a first fluid source, the second inlet adapted to be coupled to a second fluid source, and the outlet includes a first opening spaced apart from a second opening;
the housing defining a first chamber fluidly separated from a second chamber, the first chamber in fluid communication with the first inlet, the second inlet and the outlet;
a mixing system including a piston coupled to a sleeve by a rod, the sleeve disposed in the first chamber and movable by at least one of the first fluid and the second fluid based on a differential pressure to allow at least one of the first fluid and the second fluid to exit at least one of the first opening and the second opening of the outlet, and the piston is disposed in the second chamber and movable by the first fluid;
a check valve disposed in the outlet adjacent to the second opening to prevent a flow of fluid into the second opening of the outlet;
the housing defining a fluid passageway that extends from near the first inlet to the second chamber; and
an actuator that is movable between a first position and a second position, in the first position the fluid passageway is closed and in the second position, the fluid passageway is open such that the first opening and the second opening of the outlet are closed by the sleeve based on a movement of the piston in the second chamber.

15. The pneumatic mixing valve of claim 14, wherein the sleeve includes a first portion separated from a second portion by a support, the first portion is in fluid communication with the first inlet and the second portion is in fluid communication with the second inlet, the first portion includes a first channel that aligns with the first opening to enable the first fluid to exit into the outlet, and the second portion includes a second channel that aligns with the second opening to enable the second fluid to exit into the outlet.

* * * * *